(12) United States Patent
Huang et al.

(10) Patent No.: US 10,324,270 B2
(45) Date of Patent: Jun. 18, 2019

(54) CAMERA LENS

(71) Applicant: ZHEJIANG SUNNY OPTICS CO., LTD., Ningbo, Zhejiang (CN)

(72) Inventors: Lin Huang, Zhejiang (CN); Fujian Dai, Zhejiang (CN)

(73) Assignee: ZHEJIANG SUNNY OPTICS CO., LTD., Ningbo, Zhejiang (CN)

( * ) Notice: Subject to any disclaimer, the term of this patent is extended or adjusted under 35 U.S.C. 154(b) by 0 days.

(21) Appl. No.: 15/542,434

(22) PCT Filed: Mar. 2, 2016

(86) PCT No.: PCT/CN2016/075297
§ 371 (c)(1),
(2) Date: Jul. 9, 2017

(87) PCT Pub. No.: WO2017/041456
PCT Pub. Date: Mar. 16, 2017

(65) Prior Publication Data
US 2017/0371130 A1    Dec. 28, 2017

(30) Foreign Application Priority Data
Sep. 8, 2015   (CN) .......................... 2015 1 0566952

(51) Int. Cl.
*G02B 13/18* (2006.01)
*G02B 9/62* (2006.01)
*G02B 13/00* (2006.01)

(52) U.S. Cl.
CPC ........... *G02B 9/62* (2013.01); *G02B 13/0045* (2013.01)

(58) Field of Classification Search
CPC .. G02B 13/0045; G02B 9/62; G02B 27/0025; G02B 13/18; G02B 13/001; G02B 13/002; G02B 3/04; G02B 3/02
See application file for complete search history.

(56) References Cited

U.S. PATENT DOCUMENTS 8,385,006 B2 * 2/2013 Tsai ....................... G02B 13/18
                                                                                   359/708
9,448,387 B2    9/2016 Kubota et al.
(Continued)

FOREIGN PATENT DOCUMENTS

CN          204229035 U       3/2015
CN          204302563 U       4/2015
(Continued)

OTHER PUBLICATIONS

International Search Report dated May 24, 2016 for corresponding International Application No. PCT/CN2016/075297, filed Mar. 2, 2016.
(Continued)

*Primary Examiner* — William R Alexander
*Assistant Examiner* — Balram T Parbadia
(74) *Attorney, Agent, or Firm* — David D. Brush; Westman, Champlin & Koehler, P.A.

(57) ABSTRACT

A camera lens is provided and includes: in sequence from an object side to an image side, a first lens having a positive refractive power; a second lens having a refractive power; a third lens having a negative refractive power; a fourth lens having a positive refractive power; a fifth lens having a negative refractive power; a sixth lens having a negative refractive power. The camera lens satisfies the following relation: f/f6<−1.0; f/f4>1.5; in which, f denotes an effective focal length of the camera lens, f4 denotes an effective focal length of the fourth lens, f6 denotes an effective focal length of the sixth lens. The above-mentioned camera lens facilitates high resolution while improvement of field angle, and miniaturization of the camera lens.

15 Claims, 30 Drawing Sheets

(56) References Cited

U.S. PATENT DOCUMENTS

| | | | |
|---|---|---|---|
| 2012/0188654 A1* | 7/2012 | Huang | G02B 9/62 359/713 |
| 2012/0314301 A1* | 12/2012 | Huang | G02B 9/62 359/713 |
| 2015/0116843 A1* | 4/2015 | Jo | G02B 13/0045 359/713 |
| 2015/0146309 A1* | 5/2015 | Ota | G02B 9/62 359/757 |
| 2015/0260954 A1 | 9/2015 | Ota et al. | |
| 2016/0004042 A1* | 1/2016 | Kubota | G02B 13/0045 359/713 |

FOREIGN PATENT DOCUMENTS

| | | |
|---|---|---|
| CN | 204422851 U | 6/2015 |
| CN | 105204138 A | 12/2015 |
| JP | 2014044443 A | 3/2014 |

OTHER PUBLICATIONS

Written Opinion of the International Searching Authority dated May 24, 2016 for corresponding International Application No. PCT/CN2016/075297, filed Mar. 2, 2016.

* cited by examiner

Longitudinal aberration curve

Astigmatism curve

CAMERA LENS

CROSS-REFERENCE TO RELATED APPLICATION

This application is a Section 371 National Stage Application of International Application No. PCT/CN2016/075297, filed Mar. 2, 2016, the entire content of which is incorporated herein by reference, and published as WO 2017/041456 on Mar. 16, 2017, not in English, which claims priority to and benefits of Chinese Patent Application Serial No. 201510566952.4, filed with the State Intellectual Property Office of P. R. China on Sep. 8, 2015, the entire content of which is incorporated herein by reference.

FIELD

The present disclosure relates to a field of camera shooting, and more particularly to a thin-type camera lens with high resolution.

BACKGROUND

A photosensitive element in a general optical system is nothing more than a charge coupled device (CCD) or a complementary metal oxide semiconductor (CMOS). With the development of chip technology, a pixel dimension of the photosensitive element is constantly reducing, so that a camera lens carried on electronic products such as a mobile phone or a digital camera is developing to have high resolution, miniaturization and large field angle.

A general camera lens with the high resolution and large field angle needs a configuration of large aperture, such that requirements for illumination may be satisfied. However due to characteristics of large field angle and large relative aperture, the dimension often may be long, thus matching a high resolution photosensitive chip is difficult. It is mainly shown that a resolution power is not enough, a distortion is large and an angle of emergent of a chief ray is large.

SUMMARY

Embodiments of the present disclosure seek to solve at least one of the problems existing in the related art to at least some extent. For that reason, a camera lens is provided by the present disclosure.

The camera lens, in sequence from an object side to an image side, includes:

a first lens having a positive refractive power, in which an object-side surface of the first lens is a convex surface;

a second lens having a refractive power;

a third lens having a negative refractive power, in which an image-side surface of the third lens is concave at a portion near the axis and has at least one point of inflection;

a fourth lens having a positive refractive power, in which an object-side surface of the fourth lens is concave at a portion near the axis and has at least one point of inflection, an image-side surface of the fourth lens is a convex surface;

a fifth lens having a negative refractive power, in which an image-side surface of the fifth lens is concave at a portion near the axis, and at least one of an object-side surface and the image-side surface has at least one point of inflection;

a sixth lens having a negative refractive power, in which an image-side surface of the sixth lens is concave at a portion near the axis;

in which, the camera lens satisfies the following relations:

$f/f6 < -1.0$; and $f/f4 > 1.5$;

in which, f denotes an effective focal length of the camera lens, f4 denotes an effective focal length of the fourth lens, and f6 denotes an effective focal length of the sixth lens.

The camera lens satisfying the above-mentioned configuration facilitates high resolution while improvement of field angle, such that requirements for a large field angle are satisfied, matching with a chip is effectively improved, and a high resolution power and miniaturization of the camera lens are achieved.

In an embodiment, the camera lens satisfies the following relation: $T23/T12 < 0.5$;

in which, T12 denotes a distance between the first lens and the second lens along the axis, and T23 denotes a distance between the second lens and the third lens along the axis.

In an embodiment, the camera lens satisfies the following relations:

$0.5 < f/f1 < 1.0$; and $2.0 < f1/f4 < 4.0$;

in which, f1 denotes an effective focal length of the first lens.

In an embodiment, the camera lens satisfies the following relation: $f/f56 < -1.3$;

in which, f56 denotes a combined focal length of the fifth lens and the sixth lens.

In an embodiment, the camera lens satisfies the following relation: $0.6 \leq Yc32/Yc41 \leq 0.85$;

in which, Yc32 denotes a vertical distance between the point of inflection on the image-side surface of the third lens and an optical axis, Yc41 denotes a vertical distance between the point of inflection on the object-side surface of the fourth lens and the optical axis.

In an embodiment, the camera lens satisfies the following relation: $ImgH/f \geq 0.9$;

in which, ImgH denotes a half of a diagonal line of an effective pixel area on an imaging plane.

In an embodiment, an object-side surface of the sixth lens is convex at a portion near the axis, and at least one of the object-side surface and the image-side surface of the sixth lens has at least one point of inflection.

In an embodiment, an image-side surface of the first lens is a concave surface, and an object-side surface of the third lens is convex at a portion near the axis.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of embodiments of the present disclosure will become apparent and more readily appreciated from the following descriptions made with reference to the drawings, in which.

DETAILED DESCRIPTION

Figure 1:
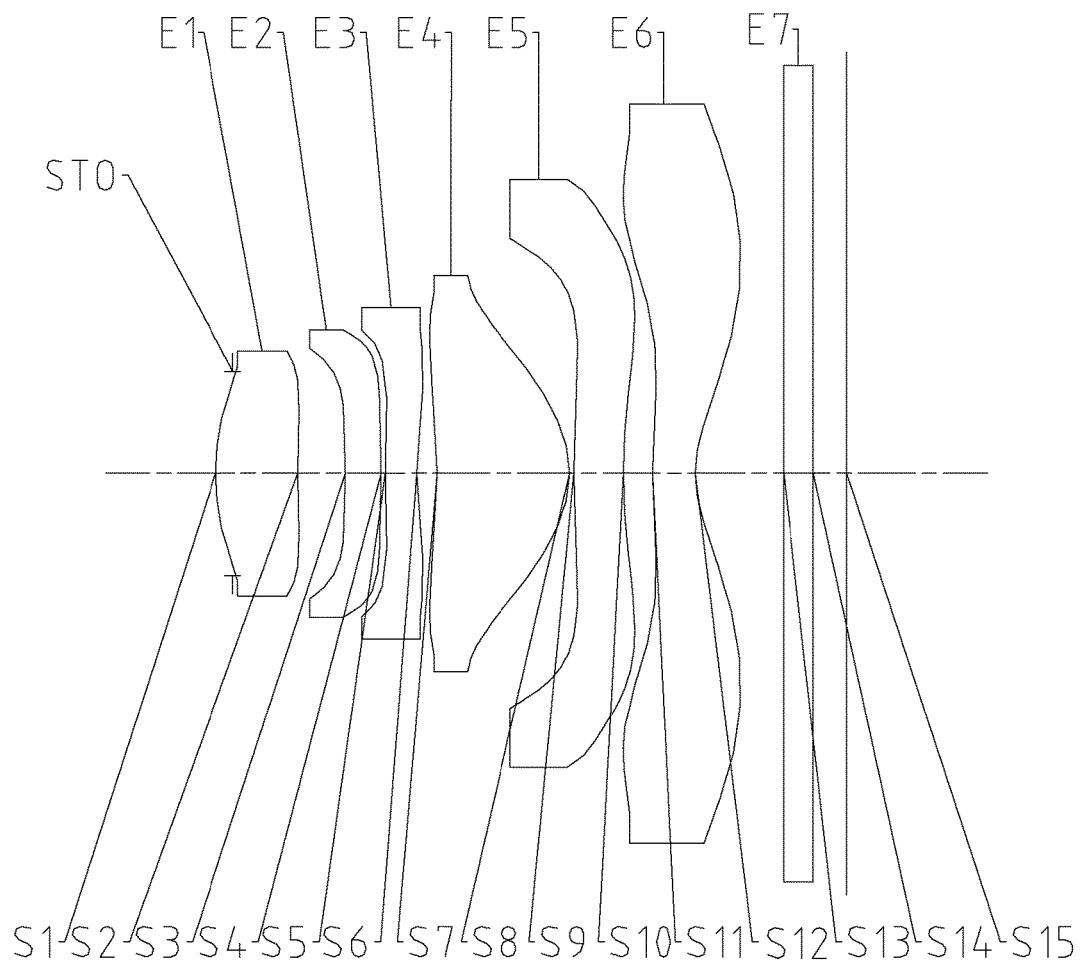
FIG. 1 is a schematic view of a camera lens according to embodiment 1.
Figure 2:
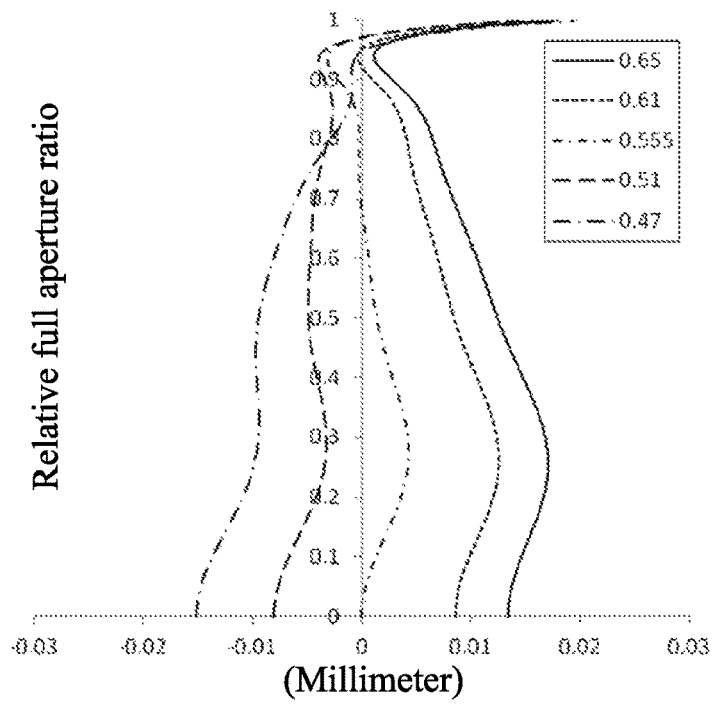
FIG. 2 is a longitudinal aberration curve (mm) of the camera lens according to embodiment 1.
Figure 3:
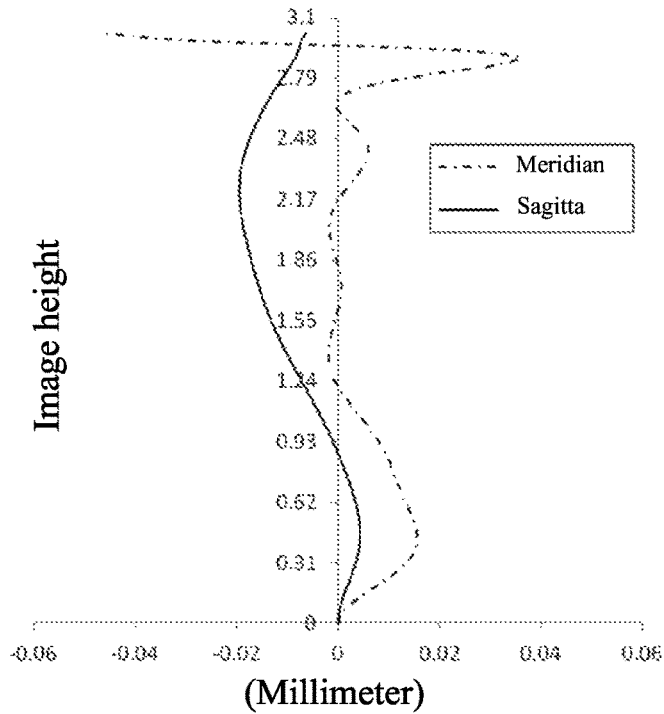
FIG. 3 is an astigmatism curve (mm) of the camera lens according to embodiment 1.
Figure 4:
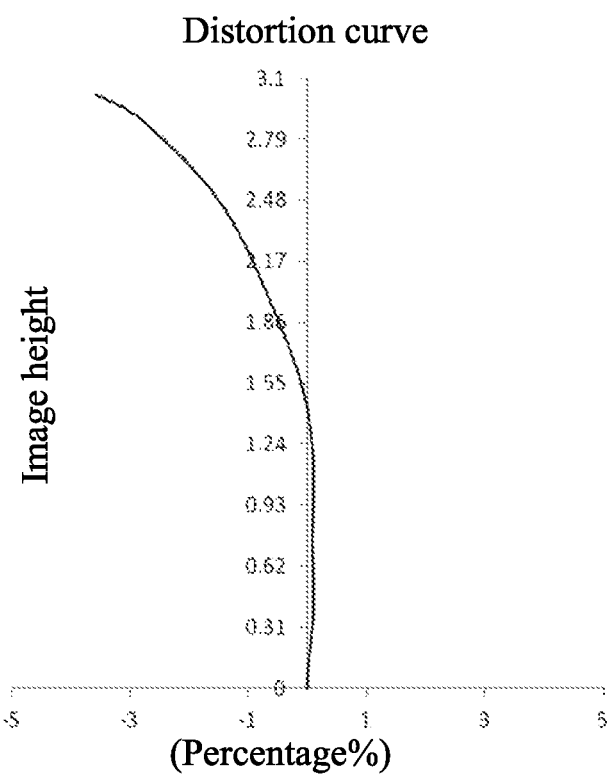
FIG. 4 is a distortion curve (%) of the camera lens according to embodiment 1.
Figure 5:
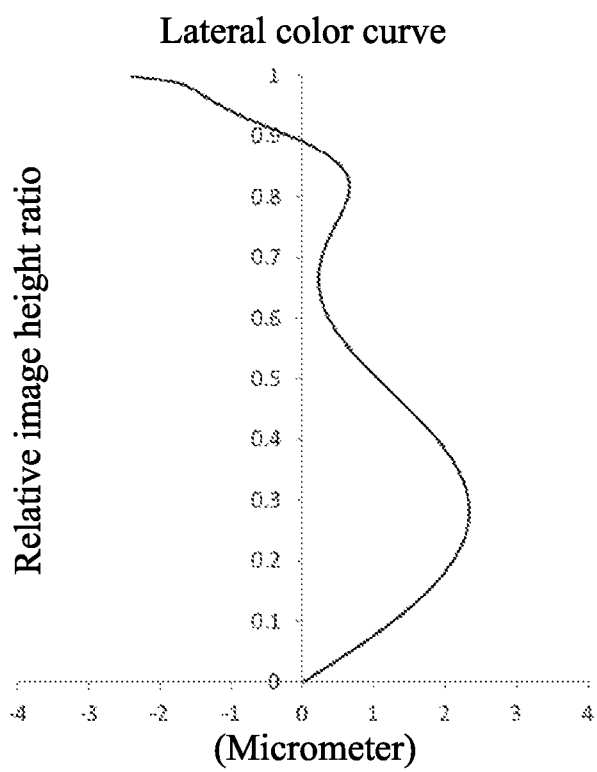
FIG. 5 is a lateral color curve (μm) of the camera lens according to embodiment 1.
Figure 6:
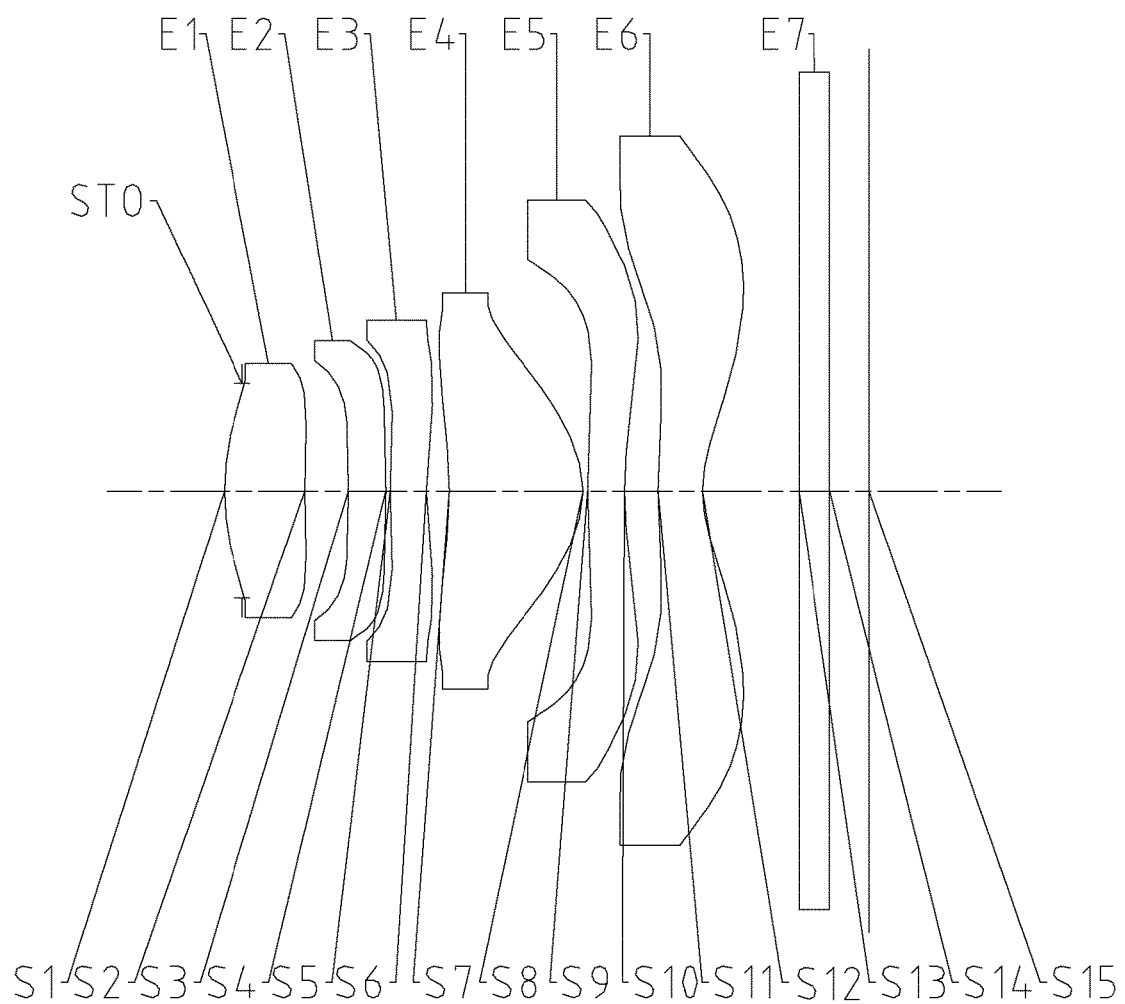
FIG. 6 is a schematic view of a camera lens according to embodiment 2.
Figure 7:
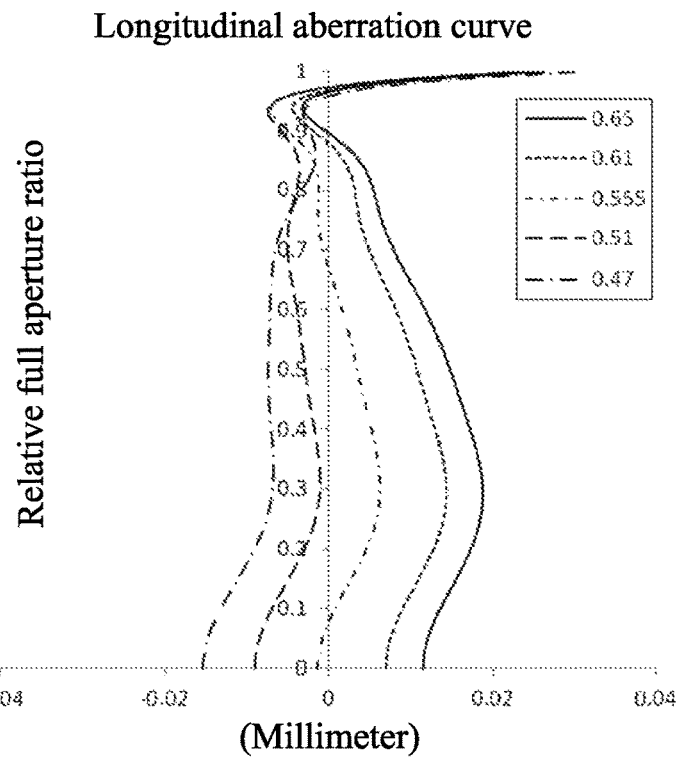
FIG. 7 is a longitudinal aberration curve (mm) of the camera lens according to embodiment 2.
Figure 8:
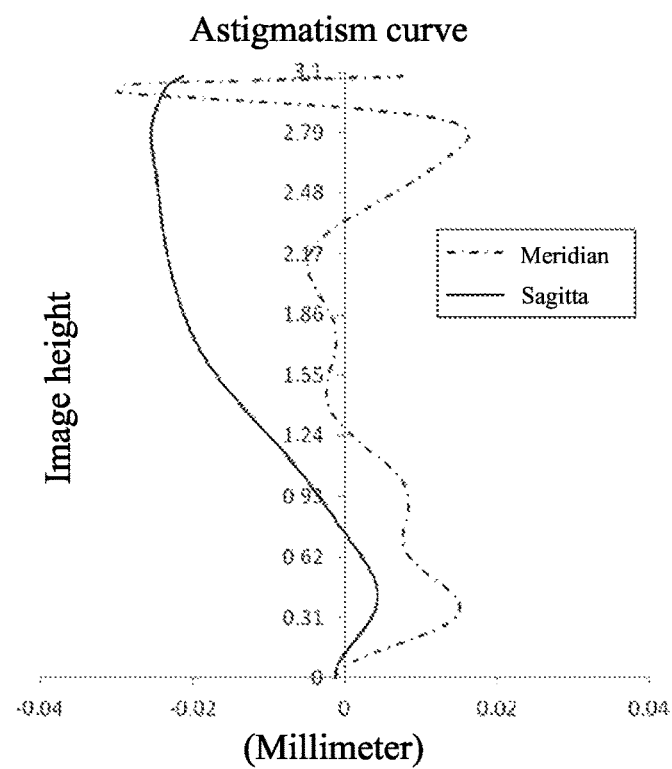
FIG. 8 is an astigmatism curve (mm) of the camera lens according to embodiment 2.
Figure 9:
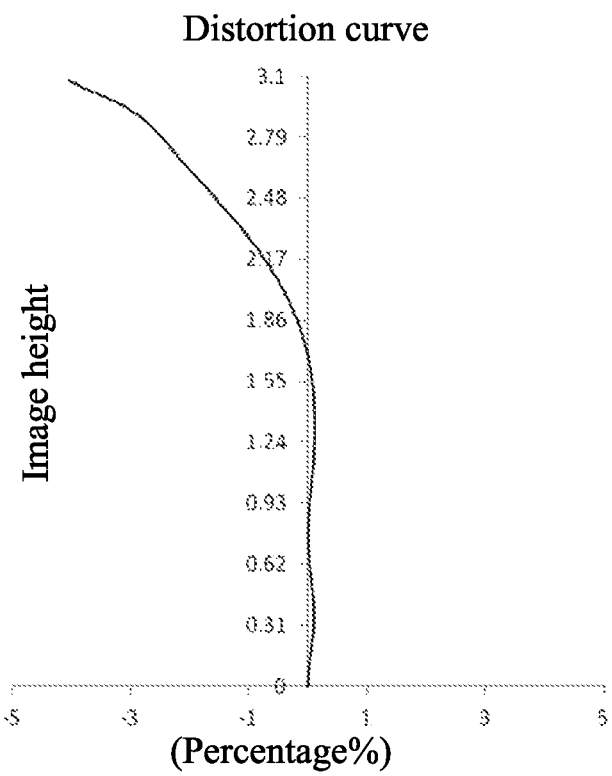
FIG. 9 is a distortion curve (%) of the camera lens according to embodiment 2.
Figure 10:
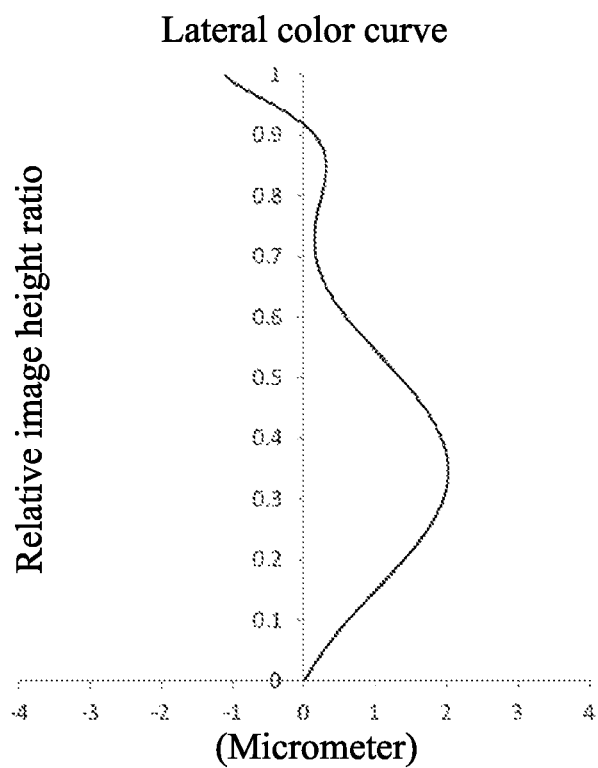
FIG. 10 is a lateral color curve (μm) of the camera lens according to embodiment 2.
Figure 11:
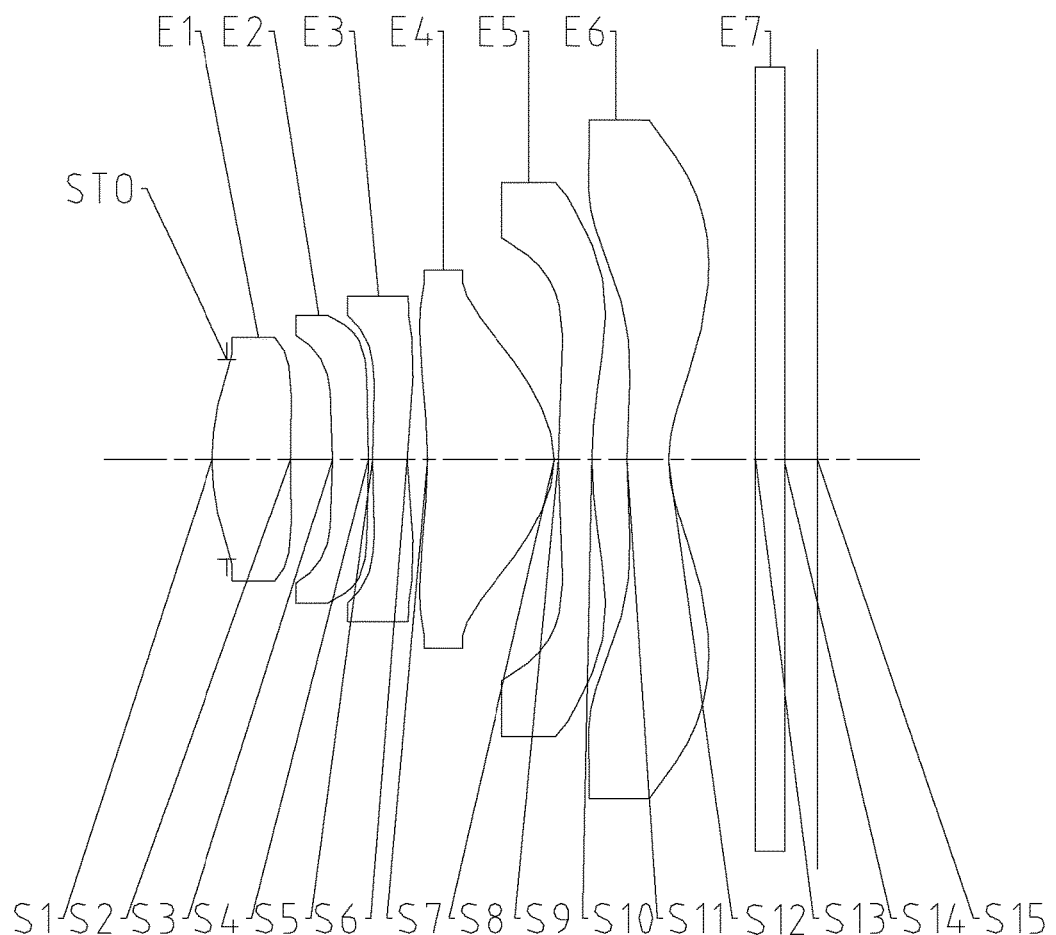
FIG. 11 is a schematic view of a camera lens according to embodiment 3.
Figure 12:
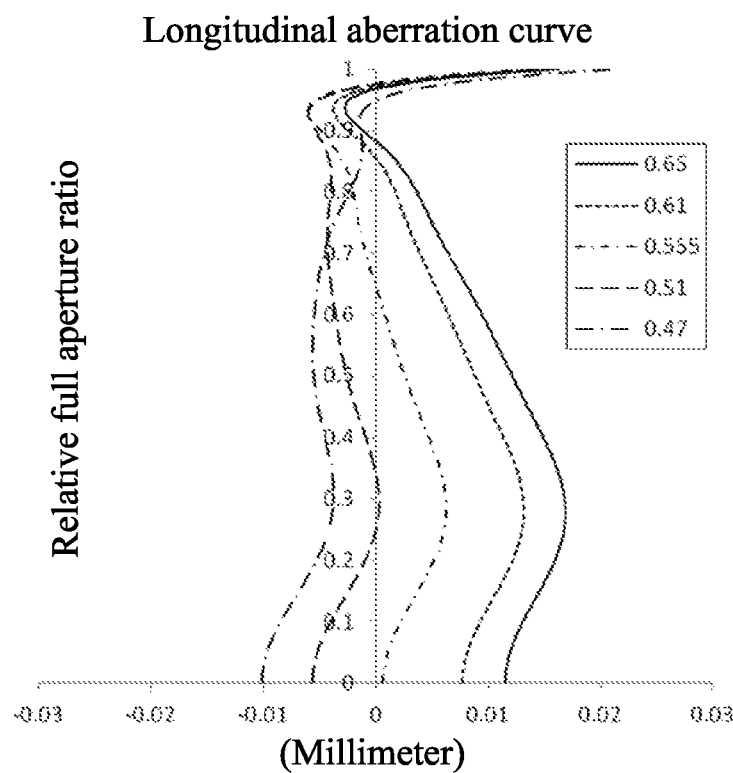
FIG. 12 is a longitudinal aberration curve (mm) of the camera lens according to embodiment 3.
Figure 13:
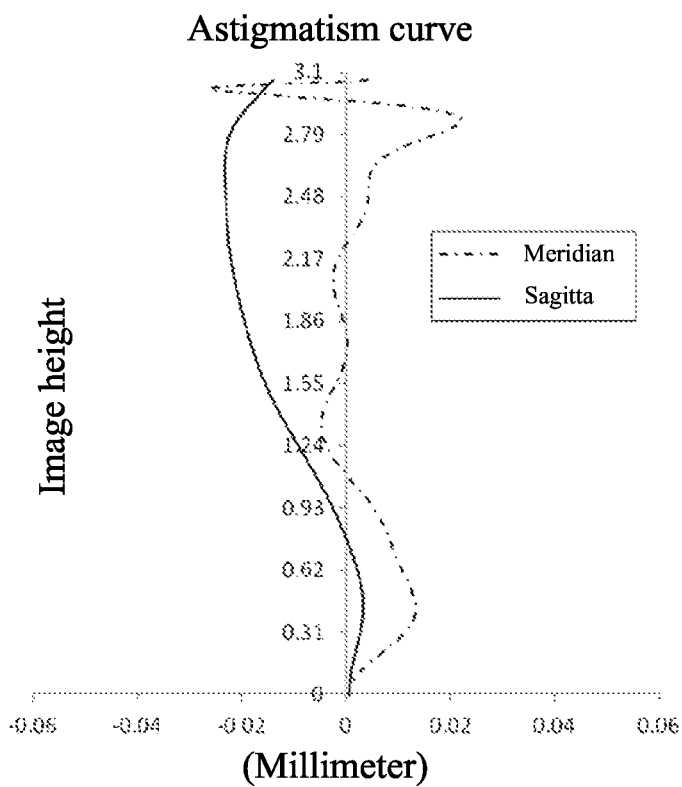
FIG. 13 is an astigmatism curve (mm) of the camera lens according to embodiment 3.
Figure 14:
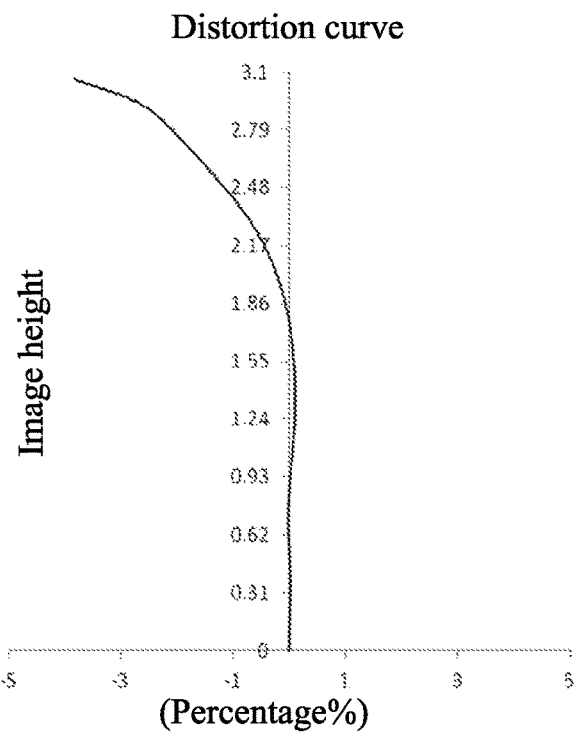
FIG. 14 is a distortion curve (%) of the camera lens according to embodiment 3.
Figure 15:
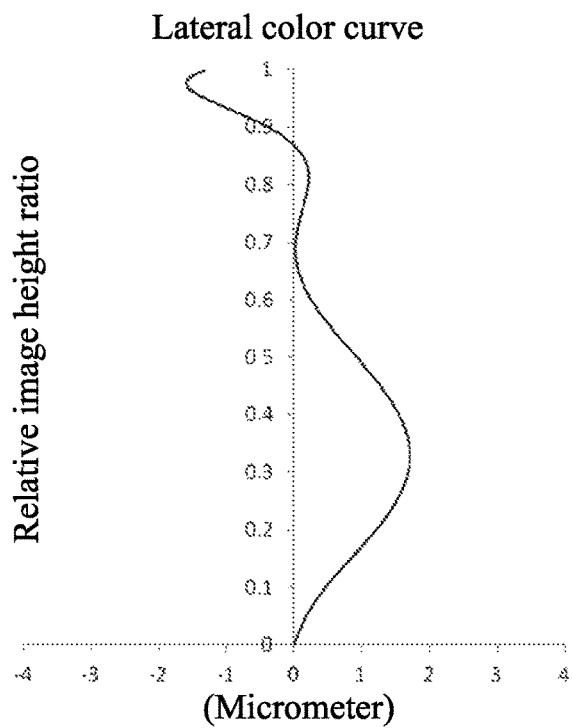
FIG. 15 is a lateral color curve (μm) of the camera lens according to embodiment 3.
Figure 16:
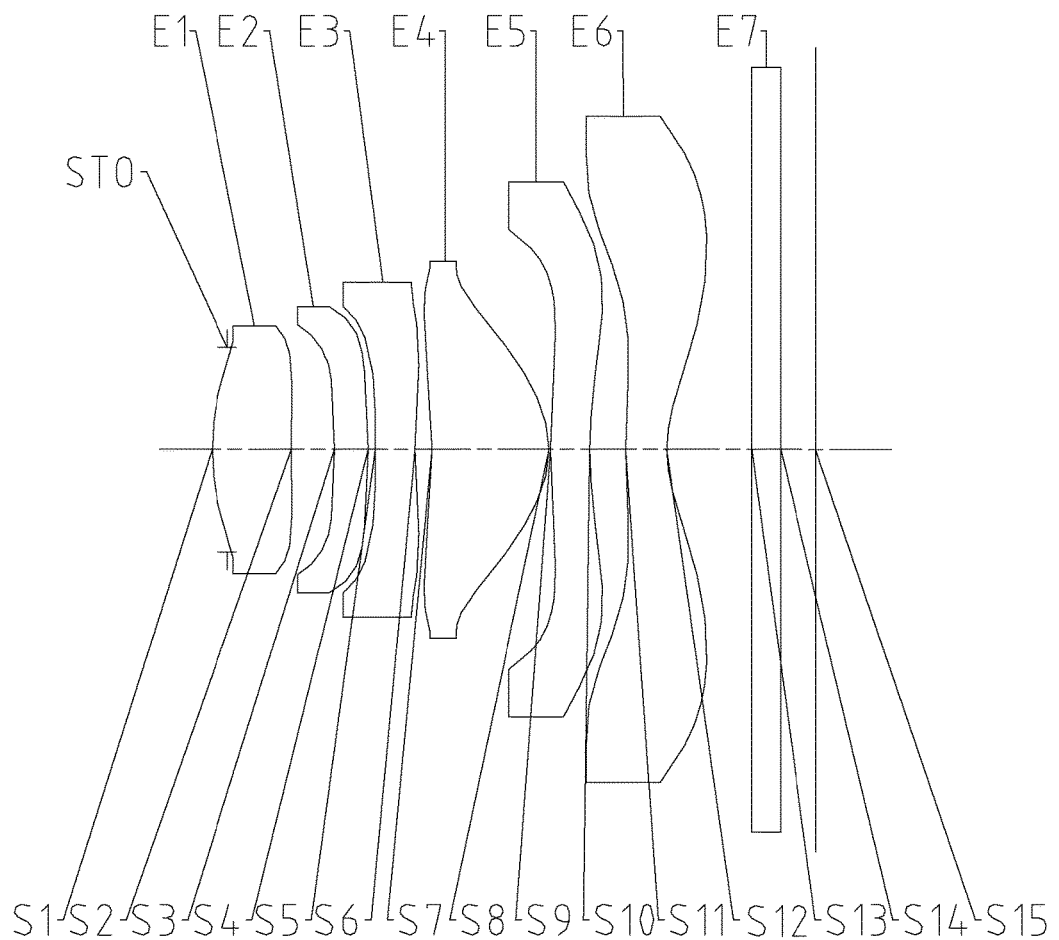
FIG. 16 is a schematic view of a camera lens according to embodiment 4.
Figure 17:
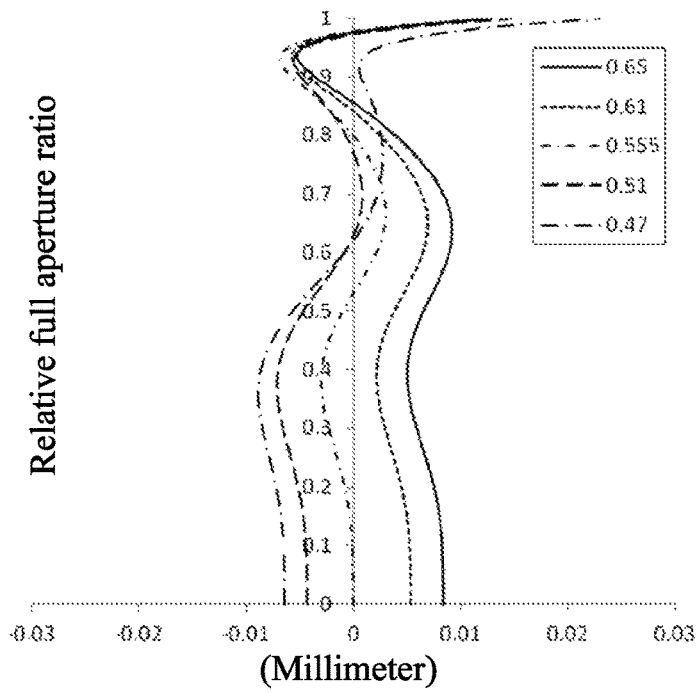
FIG. 17 is a longitudinal aberration curve (mm) of the camera lens according to embodiment 4.
Figure 18:
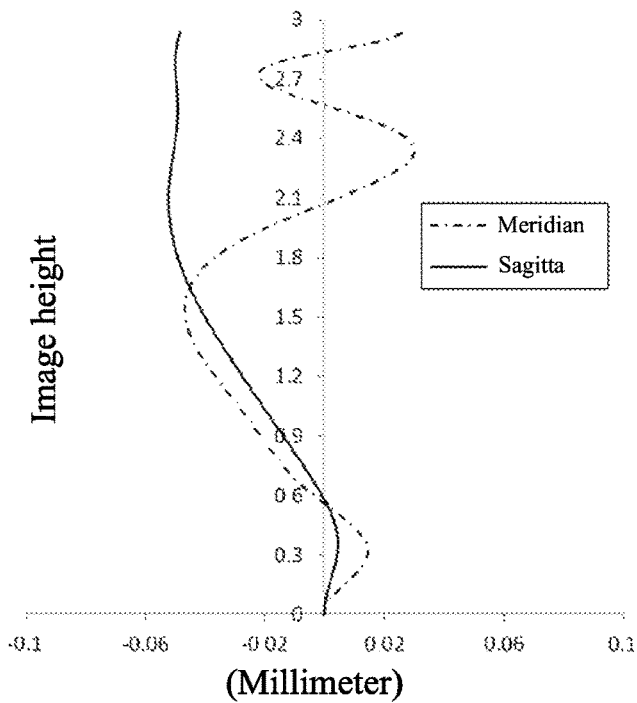
FIG. 18 is an astigmatism curve (mm) of the camera lens according to embodiment 4.
Figure 19:
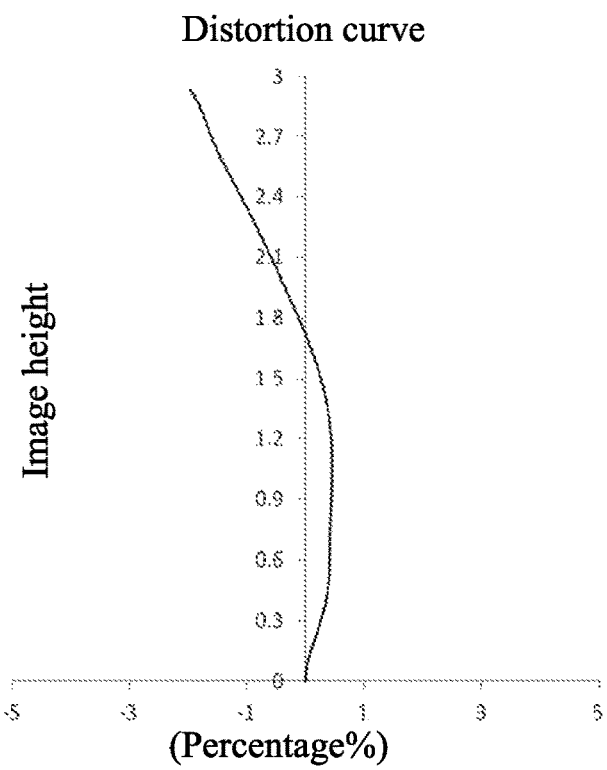
FIG. 19 is a distortion curve (%) of the camera lens according to embodiment 4.
Figure 20:
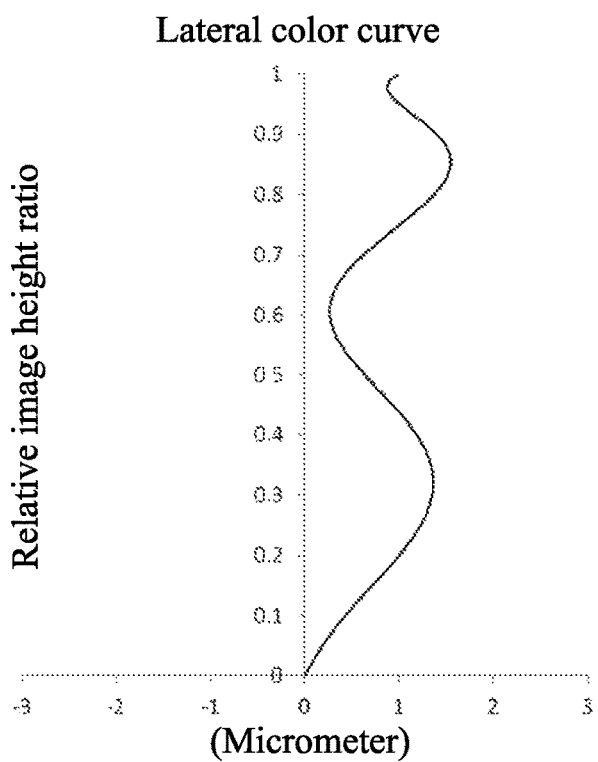
FIG. 20 is a lateral color curve (μm) of the camera lens according to embodiment 4.
Figure 21:
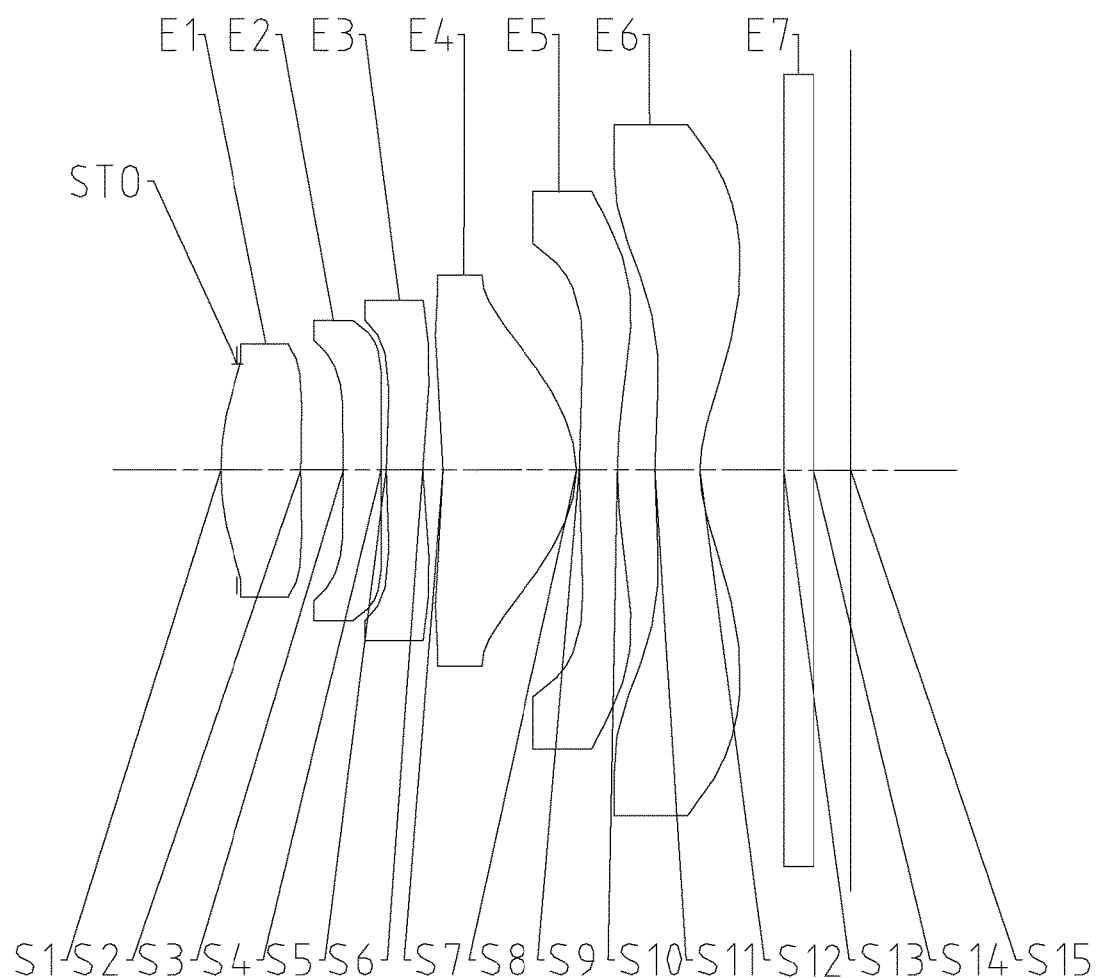
FIG. 21 is a schematic view of a camera lens according to embodiment 5.
Figure 22:
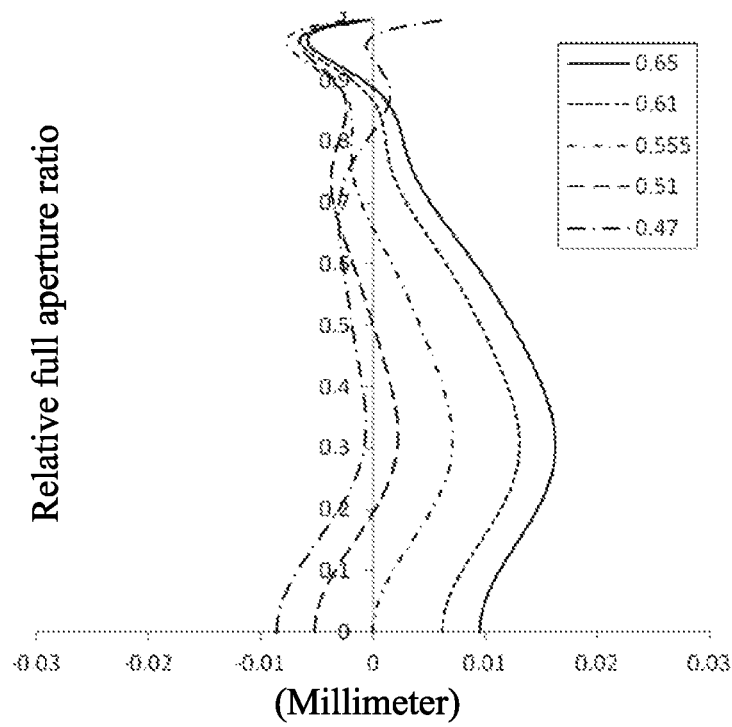
FIG. 22 is a longitudinal aberration curve (mm) of the camera lens according to embodiment 5.
Figure 23:
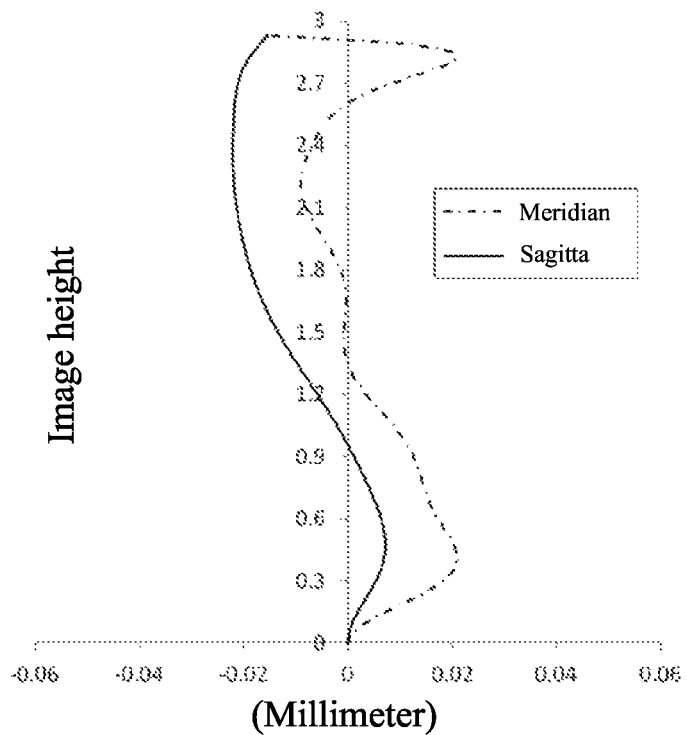
FIG. 23 is an astigmatism curve (mm) of the camera lens according to embodiment 5.
Figure 24:
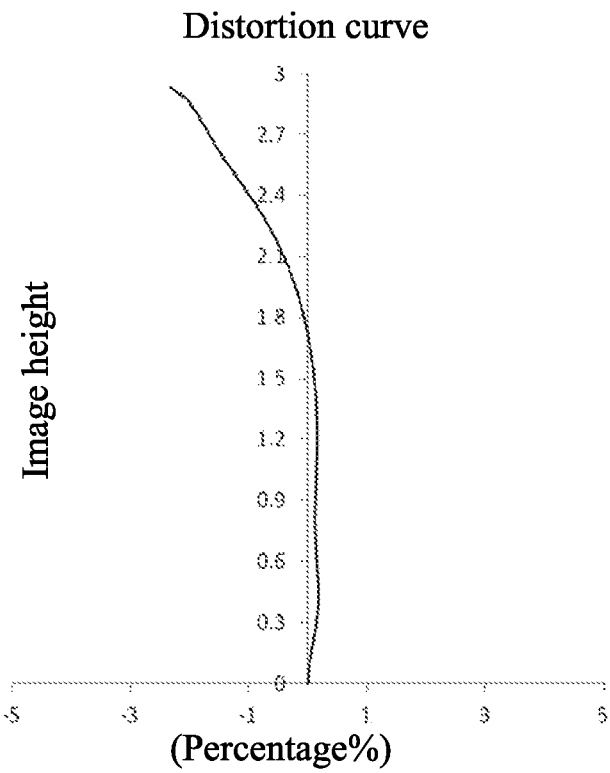
FIG. 24 is a distortion curve (%) of the camera lens according to embodiment 5.
Figure 25:
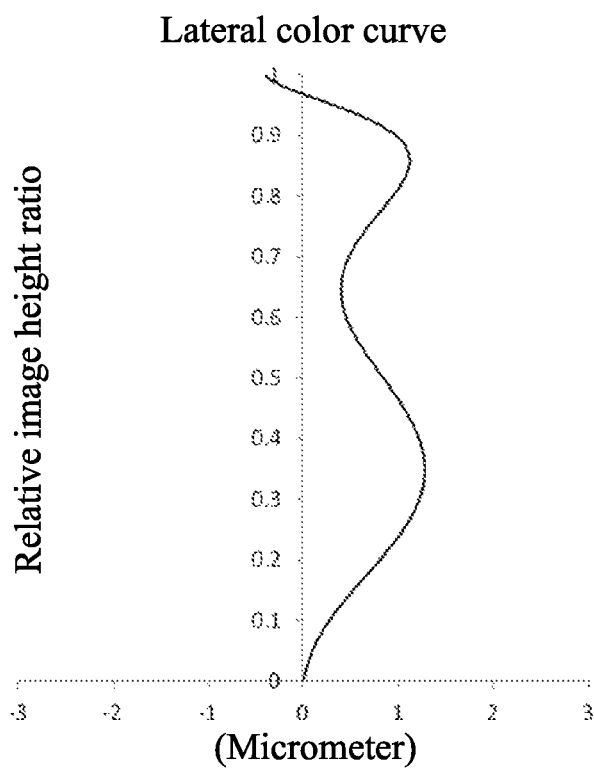
FIG. 25 is a lateral color curve (μm) of the camera lens according to embodiment 5.
Figure 26:
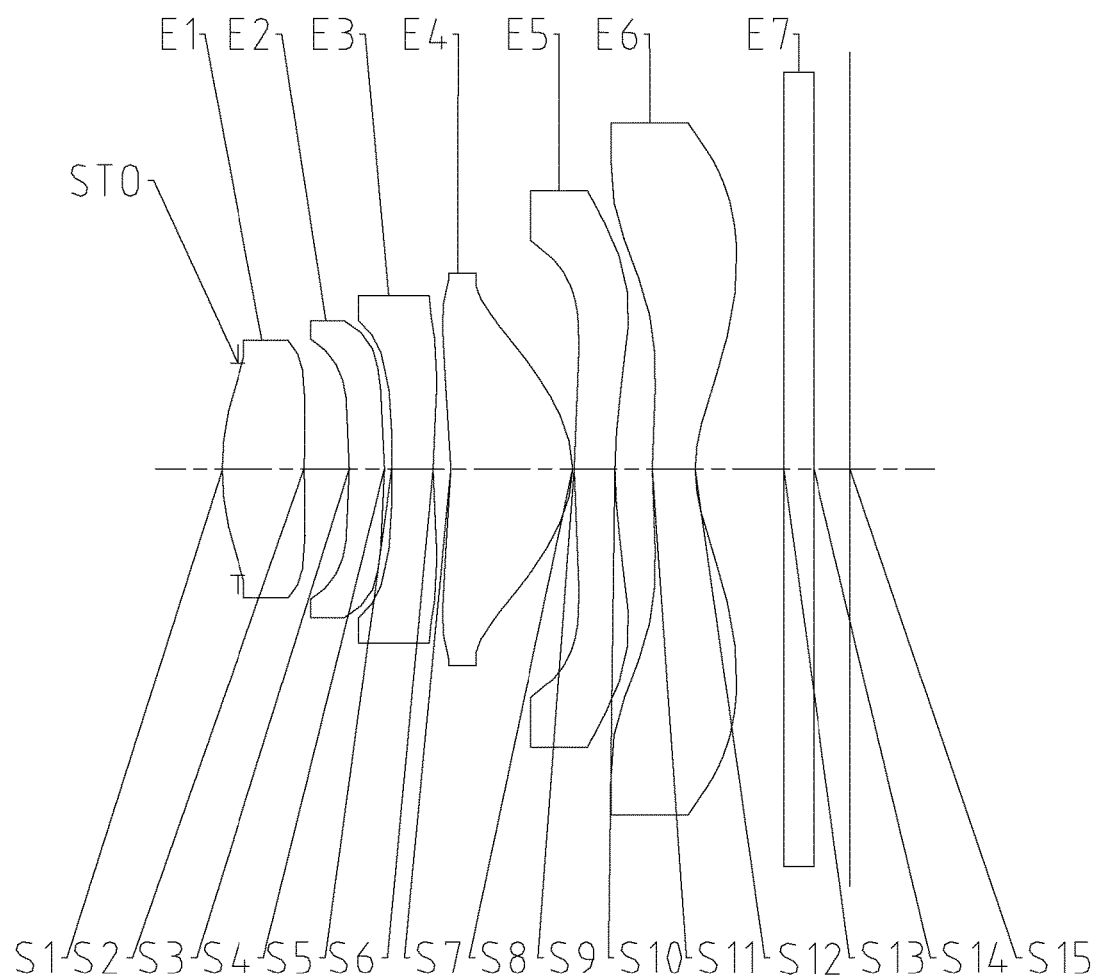
FIG. 26 is a schematic view of a camera lens according to embodiment 6.
Figure 27:
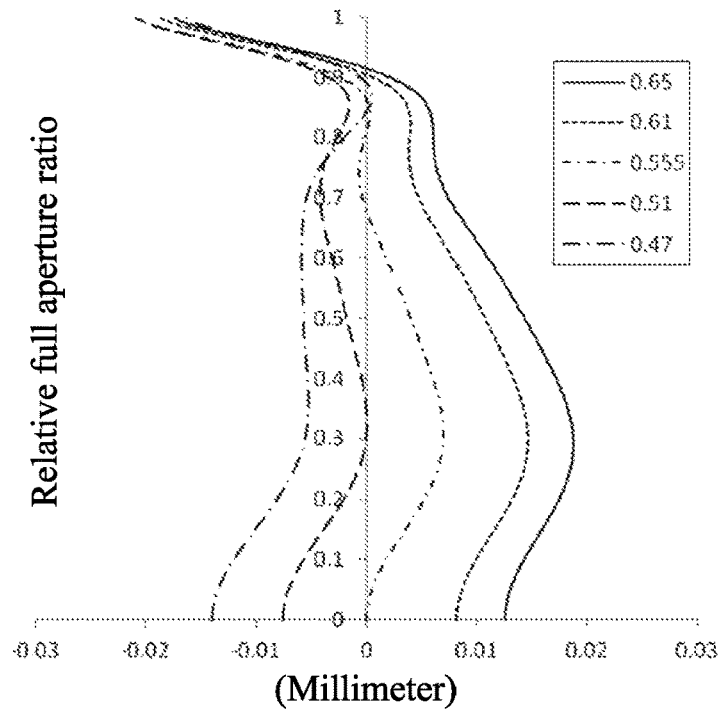
FIG. 27 is a longitudinal aberration curve (mm) of the camera lens according to embodiment 6.
Figure 28:
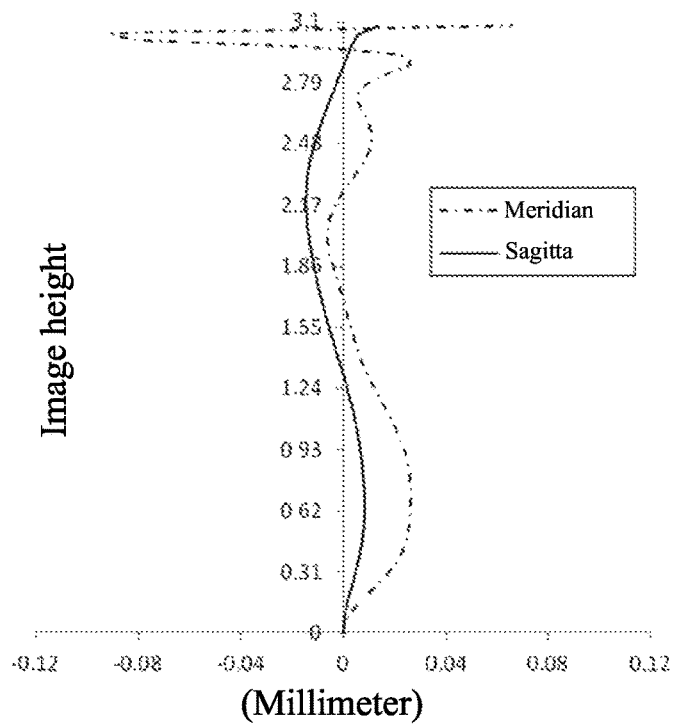
FIG. 28 is an astigmatism curve (mm) of the camera lens according to embodiment 6.
Figure 29:
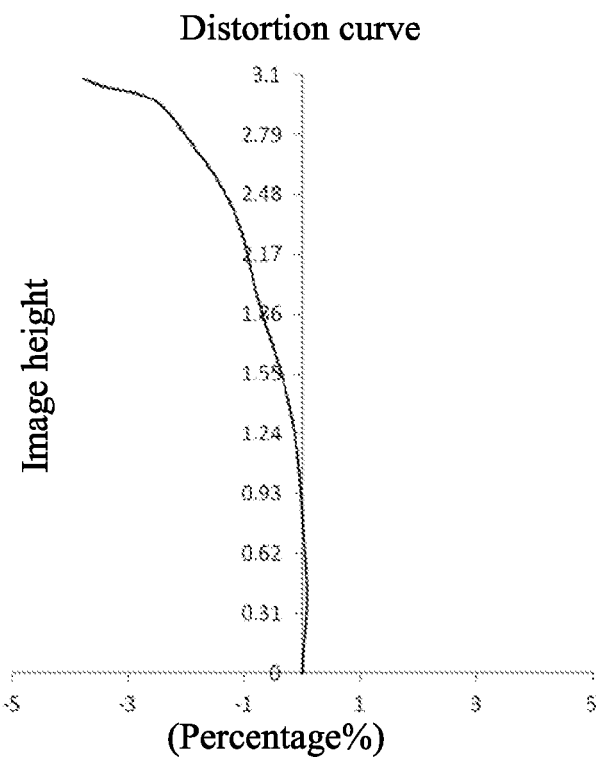
FIG. 29 is a distortion curve (%) of the camera lens according to embodiment 6.
Figure 30:
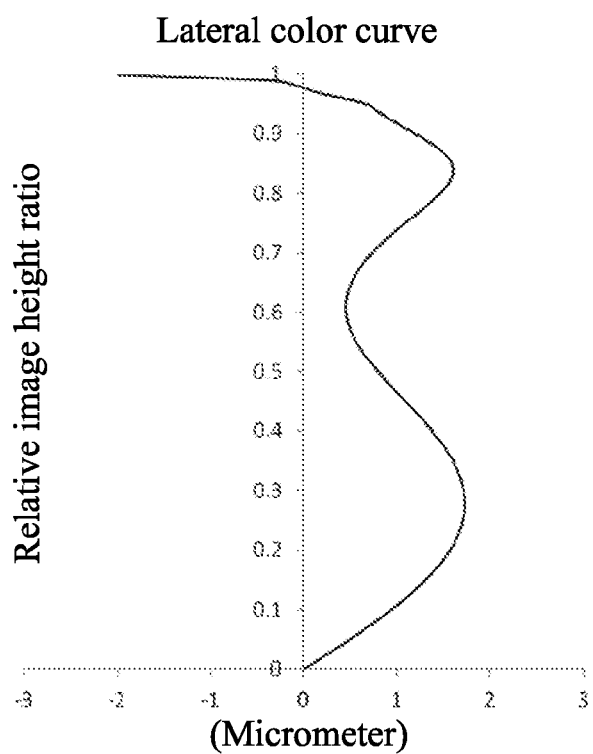
FIG. 30 is a lateral color curve (μm) of the camera lens according to embodiment 6.
Figure 31:
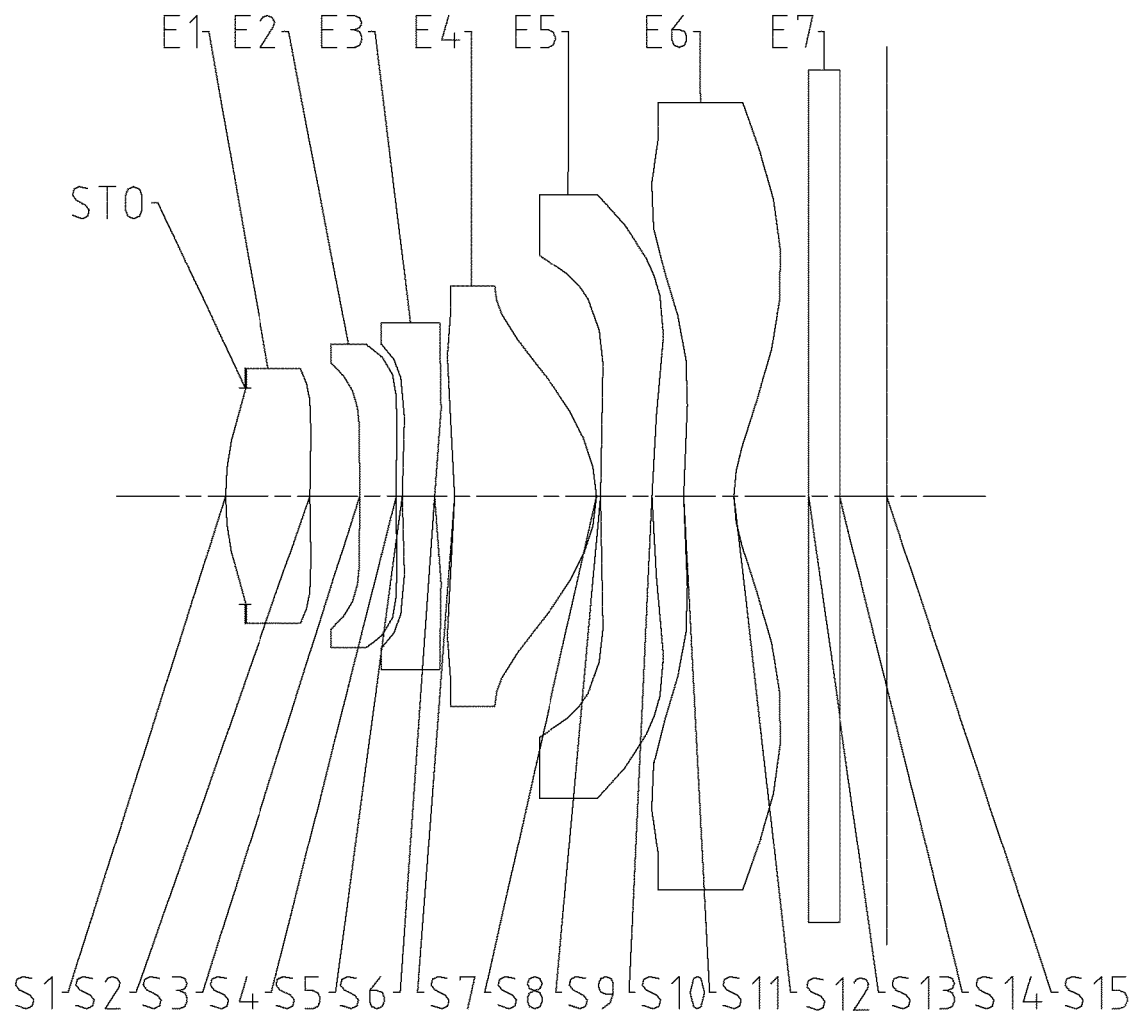
FIG. 31 is a schematic view of a camera lens according to embodiment 7.
Figure 32:
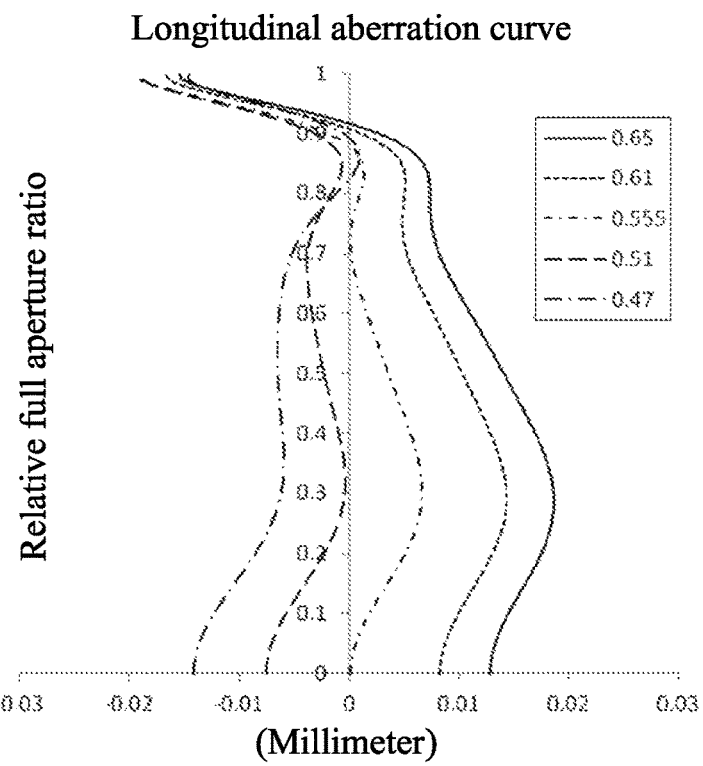
FIG. 32 is a longitudinal aberration curve (mm) of the camera lens according to embodiment 7.
Figure 33:
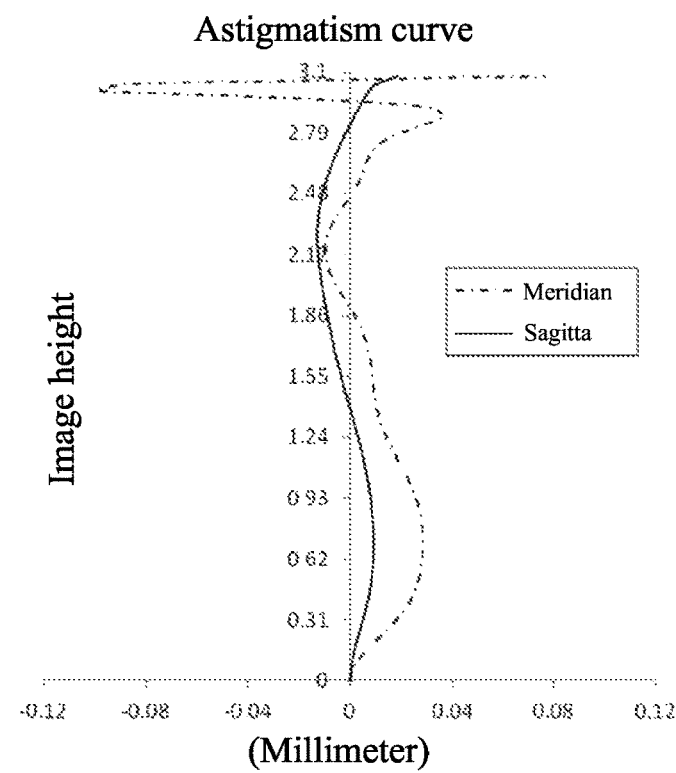
FIG. 33 is an astigmatism curve (mm) of the camera lens according to embodiment 7.
Figure 34:
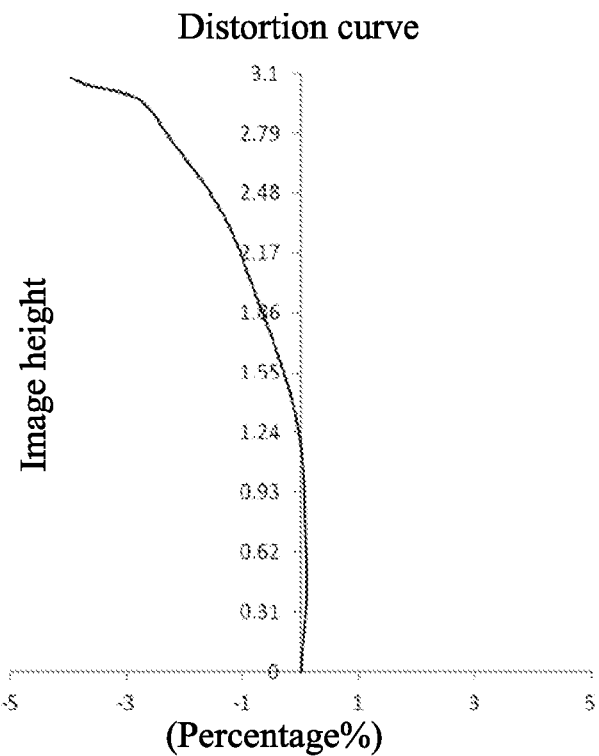
FIG. 34 is a distortion curve (%) of the camera lens according to embodiment 7.
Figure 35:
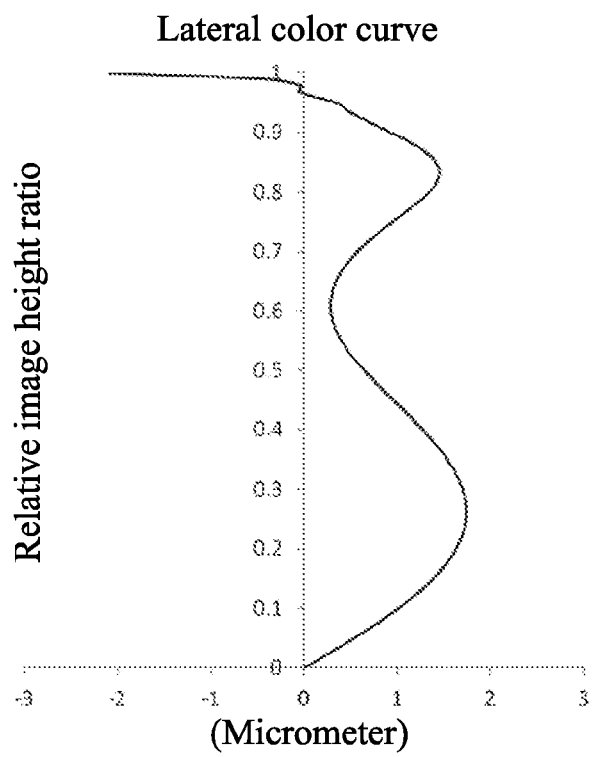
FIG. 35 is a lateral color curve (μm) of the camera lens according to embodiment 7.
Figure 36:
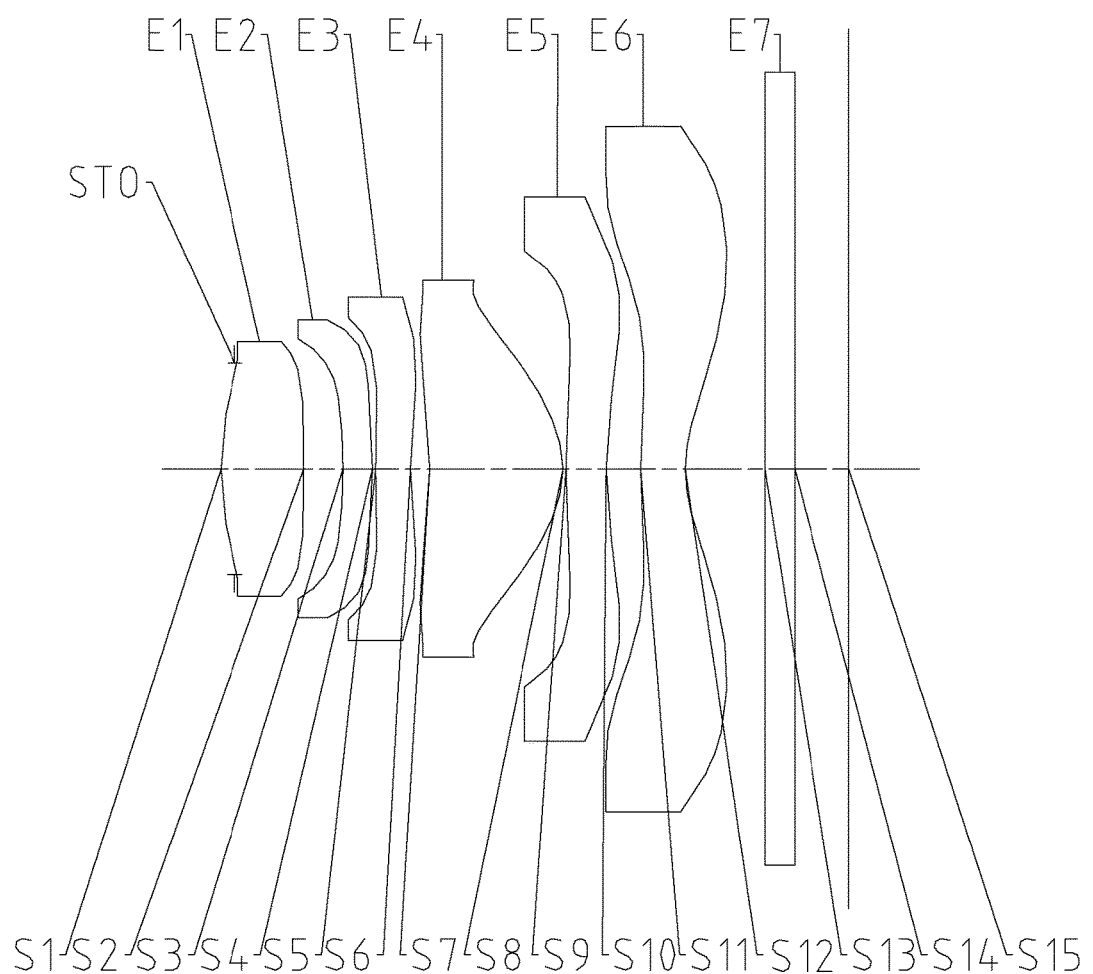
FIG. 36 is a schematic view of a camera lens according to embodiment 8.
Figure 37:
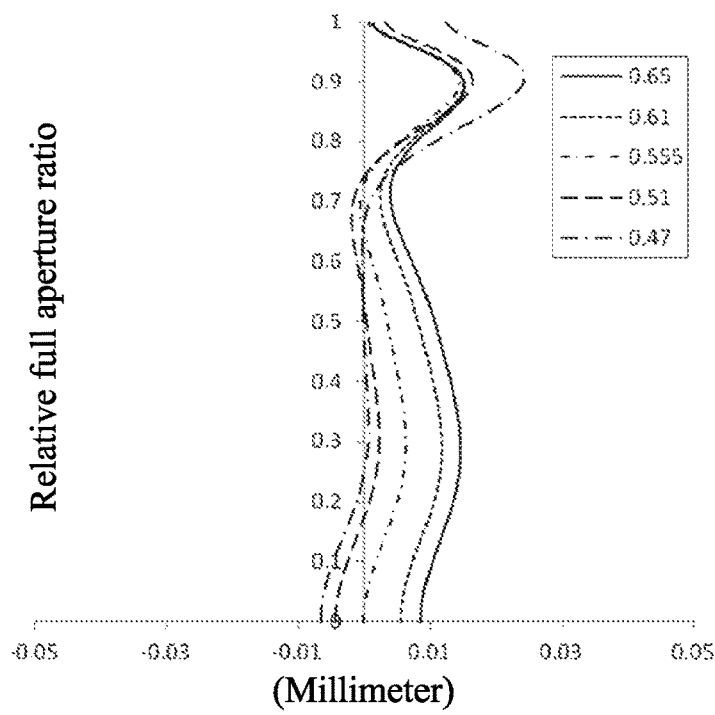
FIG. 37 is a longitudinal aberration curve (mm) of the camera lens according to embodiment 8.
Figure 38:
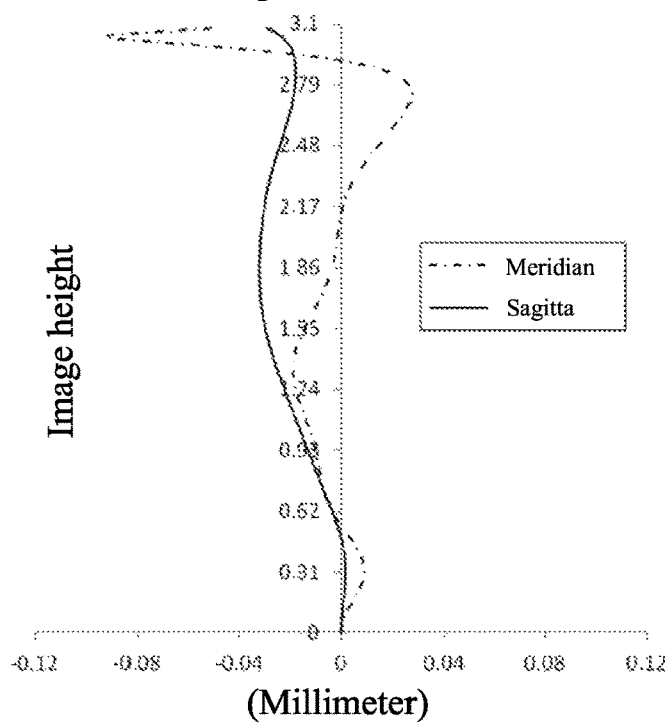
FIG. 38 is an astigmatism curve (mm) of the camera lens according to embodiment 8.
Figure 39:
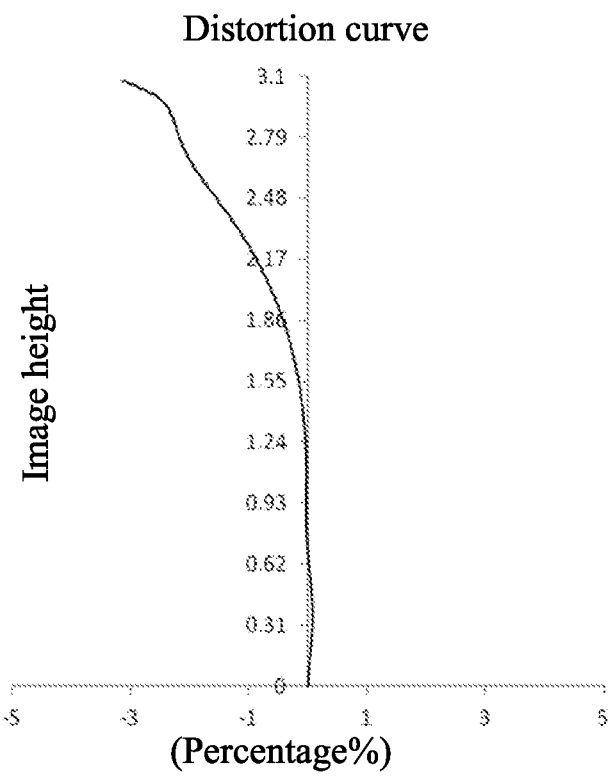
FIG. 39 is a distortion curve (%) of the camera lens according to embodiment 8.
Figure 40:
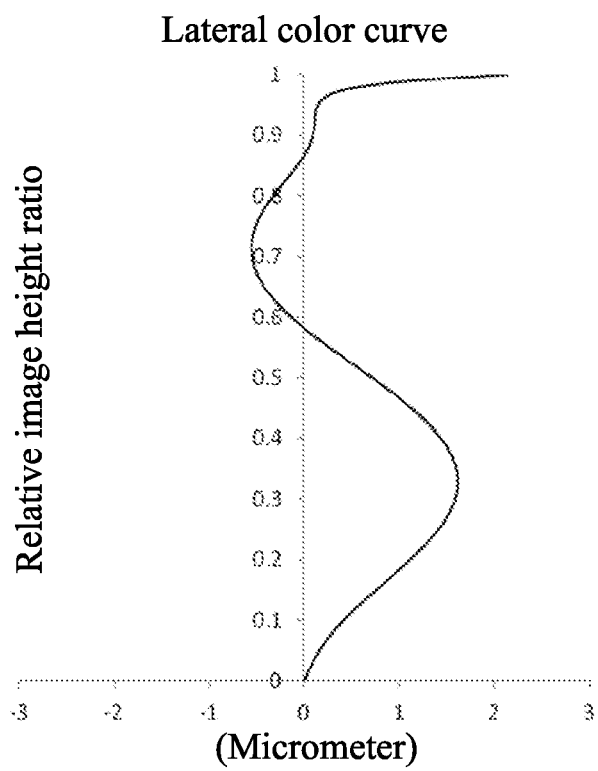
FIG. 40 is a lateral color curve (μm) of the camera lens according to embodiment 8.
Figure 41:
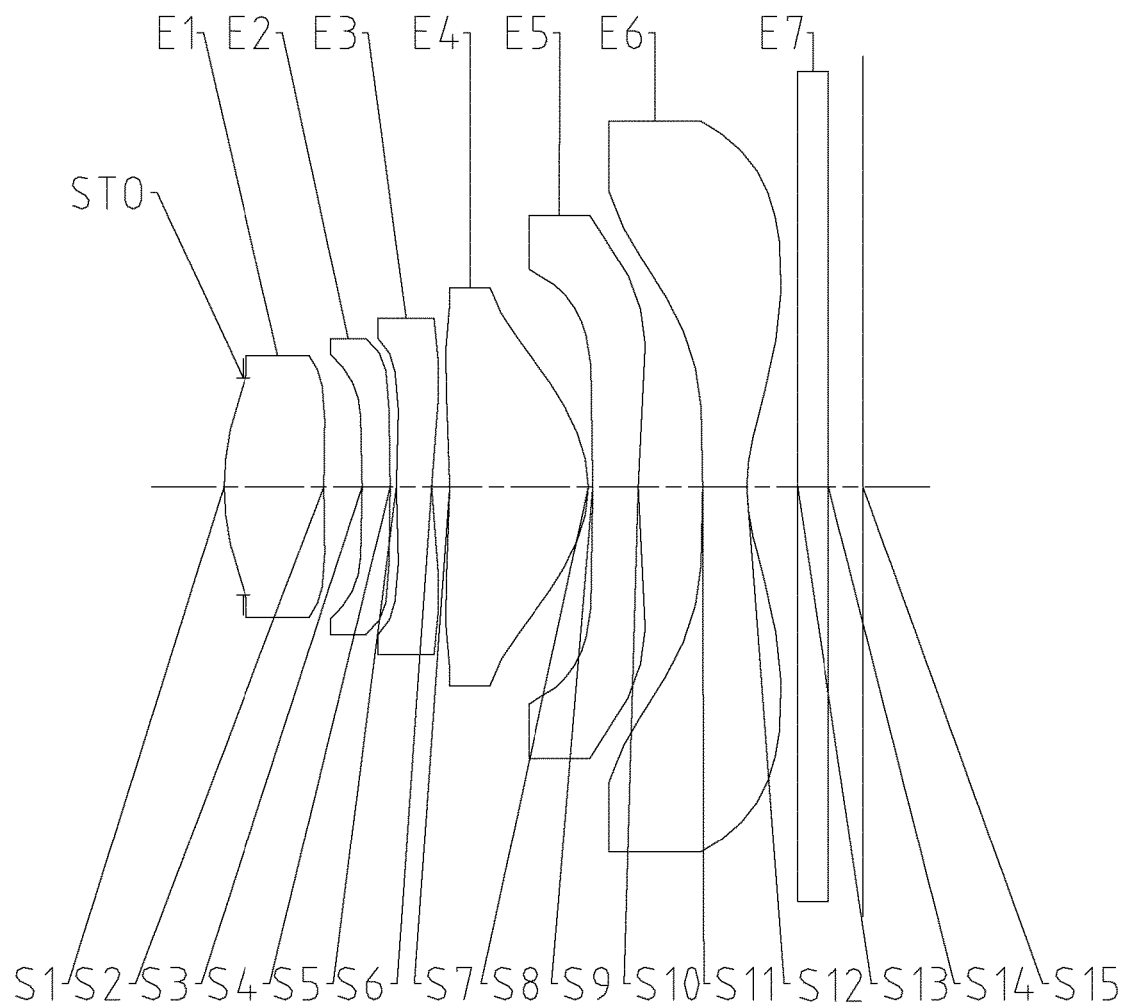
FIG. 41 is a schematic view of a camera lens according to embodiment 9.
Figure 42:
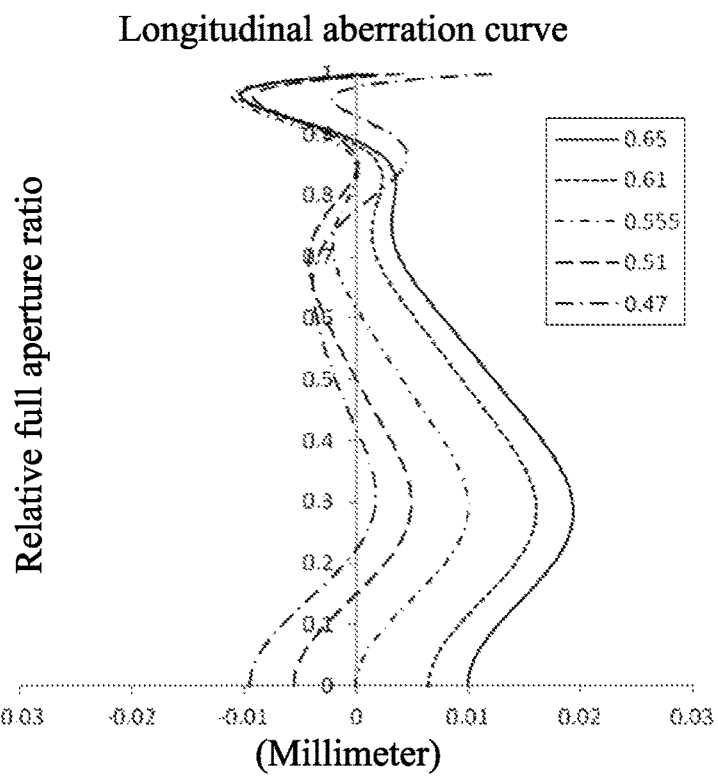
FIG. 42 is a longitudinal aberration curve (mm) of the camera lens according to embodiment 9.
Figure 43:
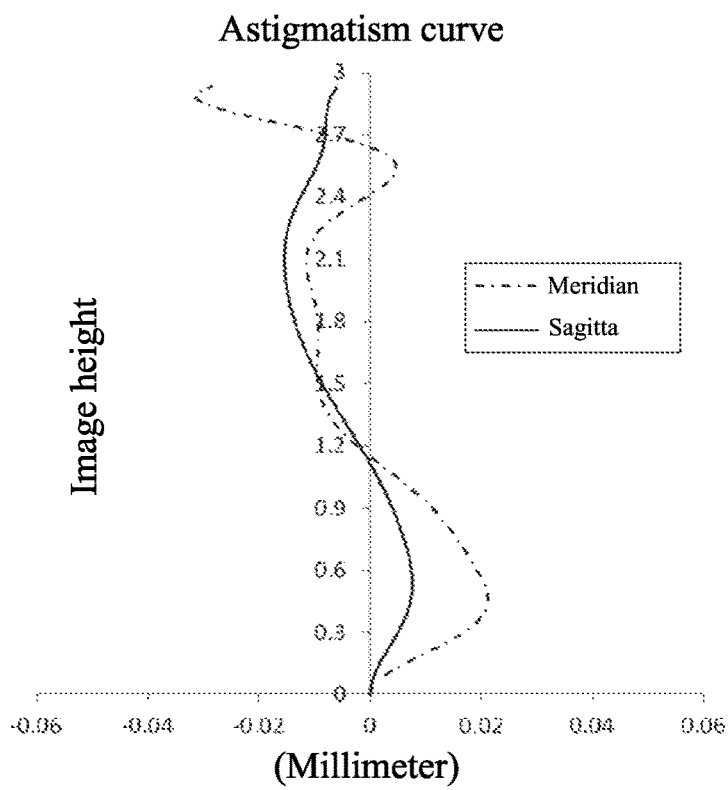
FIG. 43 is an astigmatism curve (mm) of the camera lens according to embodiment 9.
Figure 44:
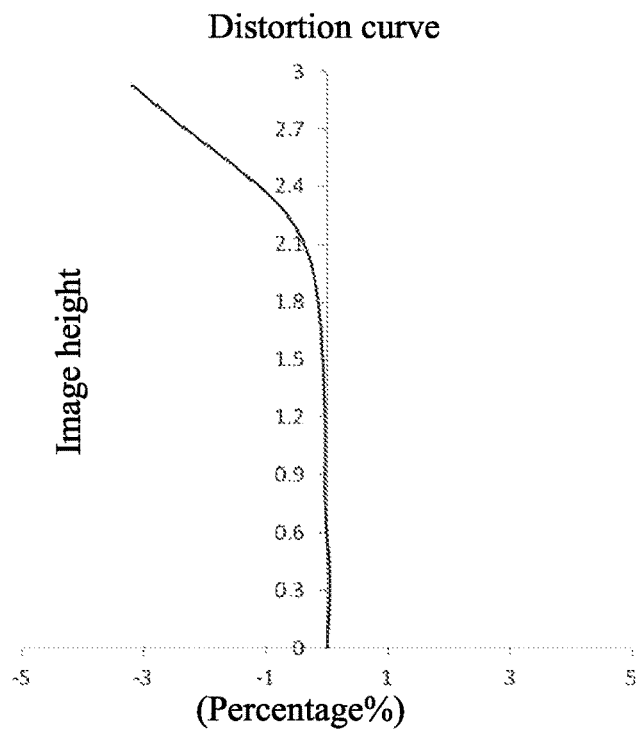
FIG. 44 is a distortion curve (%) of the camera lens according to embodiment 9.
Figure 45:
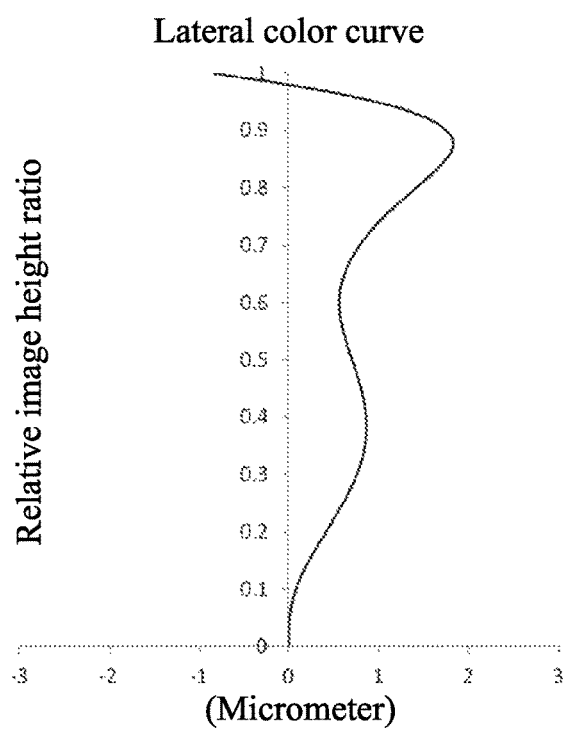
FIG. 45 is a lateral color curve (μm) of the camera lens according to embodiment 9.
Figure 46:
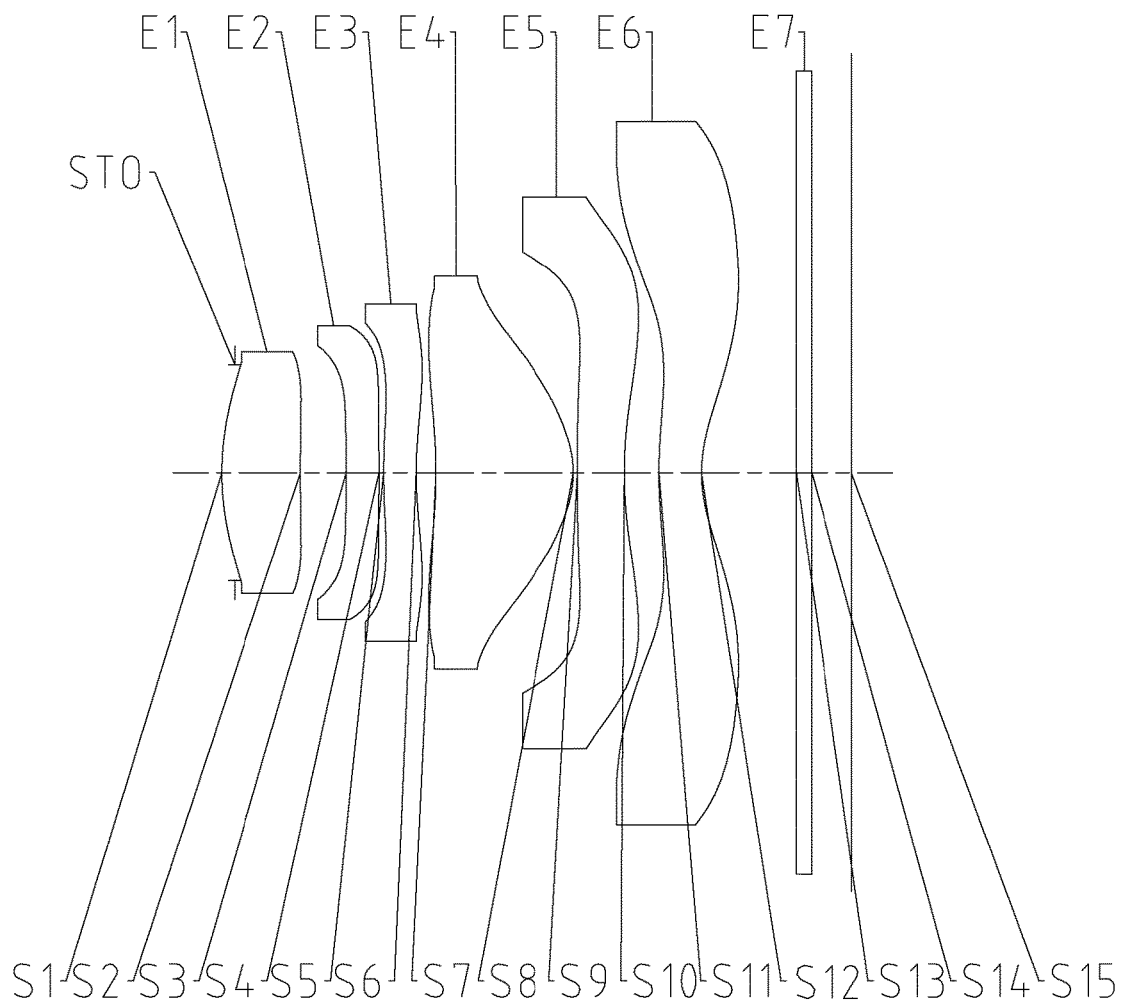
FIG. 46 is a schematic view of a camera lens according to embodiment 10.
Figure 47:
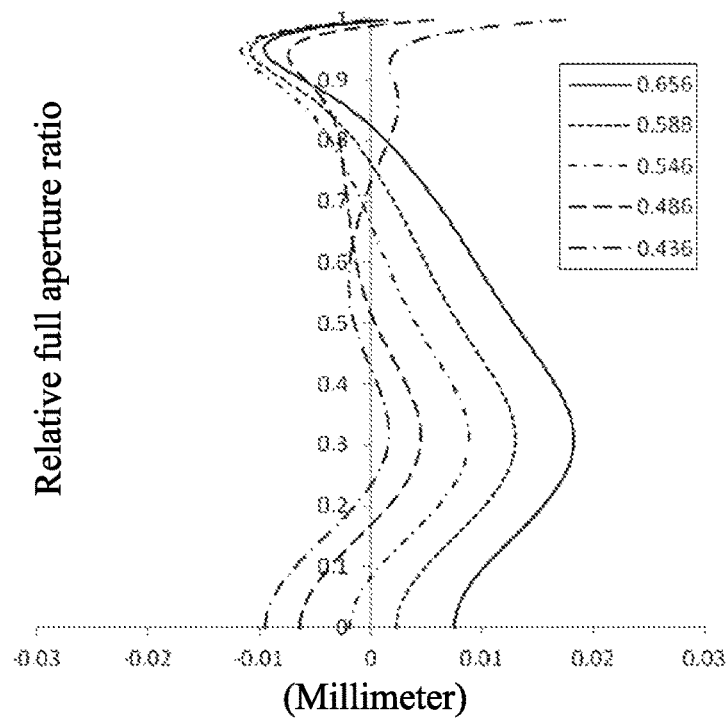
FIG. 47 is a longitudinal aberration curve (mm) of the camera lens according to embodiment 10.
Figure 48:
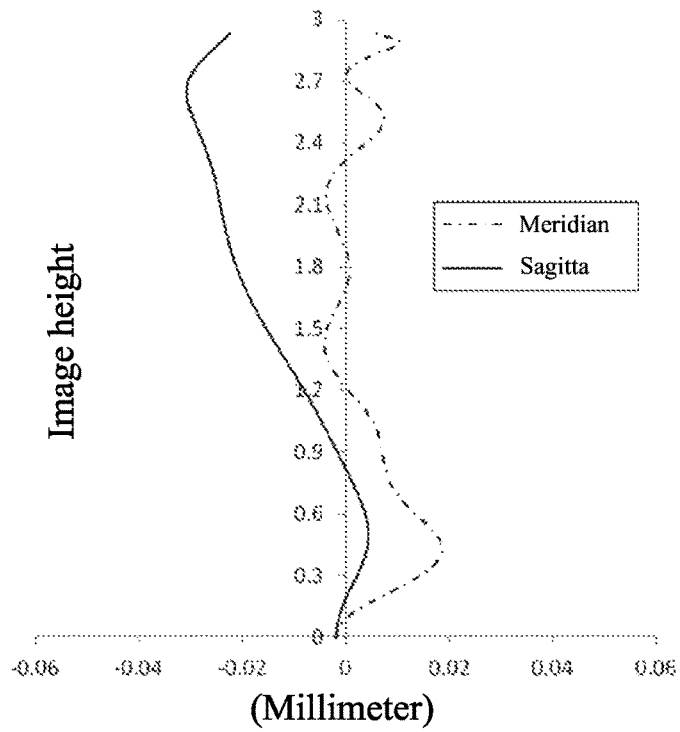
FIG. 48 is an astigmatism curve (mm) of the camera lens according to embodiment 10.
Figure 49:
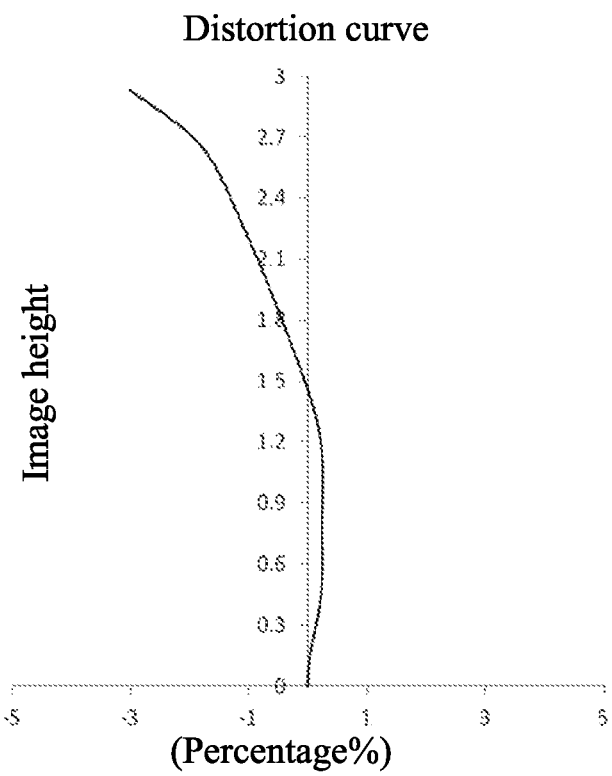
FIG. 49 is a distortion curve (%) of the camera lens according to embodiment 10.
Figure 50:
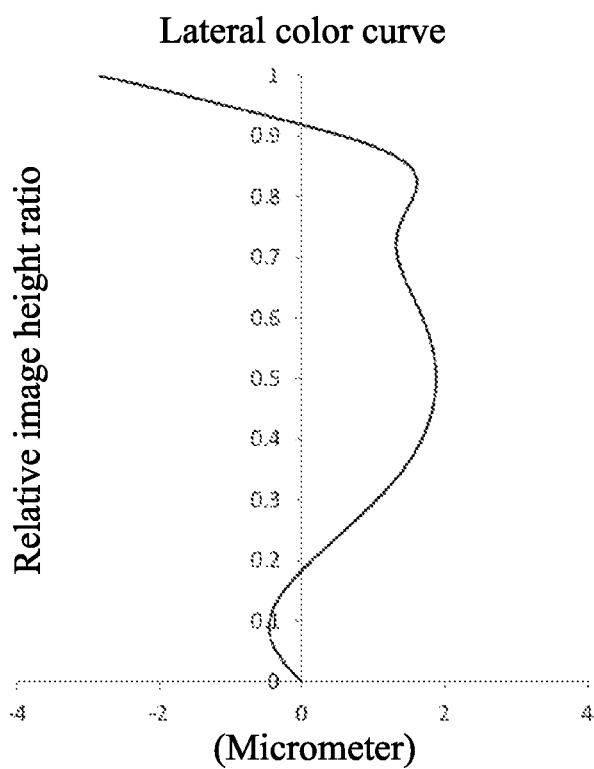
FIG. 50 is a lateral color curve (μm) of the camera lens according to embodiment 10.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the description of the present disclosure, it should be understood that, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, the term "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings.

Furthermore, examples of different processes and materials are provided in the present disclosure. However, it would be appreciated by those skilled in the art that other processes and/or materials may be also applied.

Please refer to FIG. 1, a camera lens according to a preferable embodiment of the present disclosure, in sequence from an object side to an image side, includes:

a first lens E1 having a positive refractive power, in which an object-side surface S1 of the first lens E1 is a convex surface;

a second lens E2 having a refractive power;

a third lens E3 having a negative refractive power, in which an image-side surface S6 of the third lens E3 is concave at a portion near the axis and has at least one point of inflection;

a fourth lens E4 having a positive refractive power, in which an object-side surface S7 of the fourth lens E4 is a concave at a portion near the axis and has at least one point of inflection, an image-side surface S8 of the fourth lens E4 is a convex surface;

a fifth lens E5 having a negative refractive power, in which an image-side surface S10 of the fifth lens E5 is concave at a portion near the axis, and at least one of an object-side surface S9 and the image-side surface S10 has at least one point of inflection;

a sixth lens E6 having a negative refractive power, in which an image-side surface S12 of the sixth lens E6 is concave at a portion near the axis;

in which, the camera lens satisfies the following relations:

$$f/f6 < -1.0;$$

$$f/f4 > 1.5;$$

in which, f denotes an effective focal length of the camera lens, f4 denotes an effective focal length of the fourth lens E4, f6 denotes an effective focal length of the sixth lens E6.

The camera lens satisfying the above-mentioned configuration facilitates high resolution while improvement of field angle, such that requirements for a large field angle are satisfied, matching with a chip is effectively improved, and a high resolution power and miniaturization of the camera lens are achieved.

Preferably, the camera lens satisfies the following relation: T23/T12<0.5;

in which, T12 denotes an axial distance between the first lens E1 and the second lens E2, and T23 denotes a distance between the second lens E2 and the third lens E3 along the axis.

The camera lens satisfying the above relation facilitates reduction of the distance between the lens, thus shortening a total length of the camera lens, thereby further ensuring the miniaturization of the camera lens.

Preferably, the camera lens satisfies the following relations:

$$0.5 < f/f1 < 1.0;$$

$$2.0 < f1/f4 < 4.0;$$

in which, f denotes the effective focal length of the camera lens, f1 denotes an effective focal length of the first lens E1 and f4 denotes the effective focal length of the fourth lens E4.

The camera lens satisfying the above relation facilitates distribution of refractive power of a system reasonably, thus effectively correcting an aberration of the system and improving an imaging quality.

Preferably, the camera lens satisfies the following relation: f/f56<−1.3;

in which, f denotes the effective focal length of the camera lens, and f56 denotes a combined focal length of the fifth lens E5 and the sixth lens E6.

The camera lens satisfying the above relation facilitates balance of the refractive power of the system, thus correcting distortion well and reducing an edge aberration of the system.

Preferably, the camera lens satisfies the following relation: $0.6 \leq Yc32/Yc41 \leq 0.85$;

in which, Yc32 denotes a vertical distance between the point of inflection on the image-side surface of the third lens E3 and an optical axis, Yc41 denotes a vertical distance between the point of inflection on the object-side surface of the fourth lens E4 and the optical axis.

The camera lens satisfying the above relation facilitates reduction of an angle of incidence of an edge chief ray to an image surface, thus ensuring photosensitive efficiency, so that a luminance of the overall image surface may be uniform, and the requirements for high resolution power may be satisfied.

Preferably, the camera lens satisfies the following relation: ImgH/f≥0.9;

in which, f denotes the effective focal length of the camera lens, ImgH denotes a half of a diagonal line of an effective pixel area in an imaging plane.

The camera lens satisfying the above relation facilitates improvement of the field angle of the camera lens, thus achieving the large field angle while ensuring the miniaturization of the camera lens.

Preferably, an object-side surface S11 of the sixth lens E6 in the camera lens is convex at a portion near the axis, and at least one surface of the object-side surface S11 and an image-side surface S12 of the sixth lens E6 has at least one point of inflection.

Preferably, an image-side surface S2 of the first lens E1 in the camera lens is a concave surface, and an object-side surface S5 of the third lens E3 is convex at a portion near the axis.

The camera lens satisfying the requirements for shapes of the lens may further improve a relative illumination of the edge of the camera lens, thus improving the resolution power of the camera lens. The distances between the lens are distributed reasonably, so that a structure of the camera lens may be compact relatively, and a volume of the camera lens may be reduced effectively, thus satisfying the requirements of high resolution and miniaturization for a portable electronic product.

During imaging, after passing through six lens, rays pass through an optical filter E7 having an object-side surface S13 and an image-side surface S14 and then form an image on the imaging plane S15.

In some embodiments, each of the first lens E1, the second lens E2, the third lens E3, the fourth lens E4, the fifth lens E5 and the sixth lens E6 is an aspheric lens.

A surface shape of the aspheric surface is decided by the following formula:

$$x = \frac{ch^2}{1 + \sqrt{1-(k+1)c^2h^2}} + \sum A_i h^i$$

In which, h denotes a height from any point on the aspheric surface to an optical axis, c denotes a curvature of an apex, k denotes a conic constant, Ai denotes an i-th order correction coefficient of the aspheric surface.

Embodiment 1

Referring to FIG. 1 to FIG. 5, in embodiment 1, the camera lens satisfies the following conditions shown in Table 1 and Table 2:

TABLE 1

| Surface Number | Surface Type | Radius of Curvature | Thickness | Refractive index/Abbe number | Conic Coefficient |
|---|---|---|---|---|---|
| OBJ | Spherical Surface | Infinite | 500 | — | — |
| STO | Spherical Surface | Infinite | −0.1210 | — | — |
| S1 | Aspheric Surface | 1.8947 | 0.5787 | 1.544/56.11 | 0.0727 |
| S2 | Aspheric Surface | 8.4586 | 0.3349 | — | −42.9715 |
| S3 | Aspheric Surface | −12.7036 | 0.2520 | 1.651/21.52 | −99.0000 |
| S4 | Aspheric Surface | −9.8228 | 0.0300 | — | −0.1103 |
| S5 | Aspheric Surface | 4.2726 | 0.2205 | 1.651/21.52 | −99.0000 |
| S6 | Aspheric Surface | 2.5357 | 0.1440 | — | −22.4375 |
| S7 | Aspheric Surface | −3.9771 | 0.9354 | 1.544/56.11 | −31.0304 |
| S8 | Aspheric Surface | −0.8409 | 0.0306 | — | −3.4069 |
| S9 | Aspheric Surface | 8.7627 | 0.3486 | 1.651/21.52 | −99.0000 |
| S10 | Aspheric Surface | 4.6116 | 0.2058 | — | −59.8711 |
| S11 | Aspheric Surface | 4.7987 | 0.3000 | 1.544/56.11 | 2.3860 |
| S12 | Aspheric Surface | 0.9483 | 0.6237 | — | −4.8813 |
| S13 | Spherical Surface | Infinite | 0.2100 | 1.517/64.17 | — |
| S14 | Spherical Surface | Infinite | 0.2357 | — | — |
| S15 | Spherical Surface | Infinite | — | — | — |

TABLE 2

| Surface Number | A4 | A6 | A8 | A10 | A12 | A14 | A16 |
|---|---|---|---|---|---|---|---|
| S1 | −2.1924E−02 | 7.3494E−02 | −8.0466E−01 | 3.4889E+00 | −8.5186E+00 | 1.0589E+01 | −5.3381E+00 |
| S2 | −6.4097E−02 | −9.0033E−02 | −1.2821E−01 | 3.1810E−01 | −7.7565E−01 | 9.0507E−01 | −4.1130E−01 |
| S3 | 5.7699E−03 | −2.4422E−01 | −1.2982E+00 | 5.6878E+00 | −1.2670E+01 | 1.3413E+01 | −5.3147E+00 |
| S4 | 7.8265E−02 | 1.3820E−01 | −2.0790E+00 | 6.1617E+00 | −8.8631E+00 | 5.9677E+00 | −1.5349E+00 |
| S5 | −2.3073E−01 | 3.9467E−01 | −2.1374E+00 | 6.2433E+00 | −8.4017E+00 | 5.1048E+00 | −1.1536E+00 |
| S6 | −1.4582E−01 | 1.1825E−01 | −3.7647E−01 | 7.7509E−01 | −7.7340E−01 | 3.7348E−01 | −6.8931E−02 |
| S7 | 3.5103E−02 | 8.9982E−02 | −2.4789E−01 | 2.8321E−01 | −1.6228E−01 | 4.6587E−02 | −5.4013E−03 |
| S8 | −2.1311E−01 | 2.2510E−01 | −2.3050E−01 | 1.6454E−01 | −4.1287E−02 | −5.0679E−03 | 2.6391E−03 |
| S9 | 2.4192E−02 | −8.1756E−02 | 6.3953E−02 | −4.2427E−02 | 2.0106E−02 | −5.7913E−03 | 6.9386E−04 |
| S10 | 4.8074E−02 | −6.2967E−02 | 1.7978E−02 | 1.5515E−03 | −2.5054E−03 | 6.3148E−04 | −5.2441E−05 |
| S11 | −1.2594E−01 | 3.2383E−02 | −9.1379E−03 | 4.2601E−03 | −1.1489E−03 | 1.4441E−04 | −6.9432E−06 |
| S12 | −9.7214E−02 | 4.2361E−02 | −1.4755E−02 | 3.7370E−03 | −6.0836E−04 | 5.4890E−05 | −2.0494E−06 |

In addition, f1=4.34 mm; f2=63.78 mm; f3=−10.01 mm; f4=1.77 mm; f5=−15.34 mm; f6=−2.23 mm and f=2.97 mm; HFOV=46.9°; TTL=4.45 mm; Fno=2.0.

Embodiment 2

Referring to FIG. 6-FIG. 10, in embodiment 2, the camera lens satisfies the following conditions shown in Table 3 and Table 4:

TABLE 3

| Surface Number | Surface Type | Radius of Curvature | Thickness | Refractive index/Abbe number | Conic Coefficient |
|---|---|---|---|---|---|
| OBJ | Spherical Surface | Infinite | Infinite | — | — |
| STO | Spherical Surface | Infinite | −0.1210 | — | — |
| S1 | Aspheric Surface | 1.9192 | 0.5462 | 1.544/56.11 | −0.1289 |
| S2 | Aspheric Surface | 8.0800 | 0.2943 | — | −47.1424 |
| S3 | Aspheric Surface | −14.6666 | 0.2537 | 1.651/21.52 | −99.0000 |
| S4 | Aspheric Surface | −11.3886 | 0.0301 | — | 3.2443 |
| S5 | Aspheric Surface | 3.5686 | 0.2441 | 1.651/21.52 | −96.2349 |
| S6 | Aspheric Surface | 2.5356 | 0.1548 | — | −23.1074 |
| S7 | Aspheric Surface | −3.2688 | 0.9103 | 1.544/56.11 | −30.2595 |
| S8 | Aspheric Surface | −0.7420 | 0.0300 | — | −3.8153 |
| S9 | Aspheric Surface | 9.2058 | 0.2500 | 1.651/21.52 | −82.3337 |
| S10 | Aspheric Surface | 2.9277 | 0.2282 | — | −60.6513 |
| S11 | Aspheric Surface | 4.7760 | 0.3000 | 1.544/56.11 | 2.3205 |
| S12 | Aspheric Surface | 0.9576 | 0.6541 | — | −5.5000 |

TABLE 3-continued

| Surface Number | Surface Type | Radius of Curvature | Thickness | Refractive index/Abbe number | Conic Coefficient |
|---|---|---|---|---|---|
| S13 | Spherical Surface | Infinite | 0.2100 | 1.517/64.17 | — |
| S14 | Spherical Surface | Infinite | 0.2660 | — | — |
| S15 | Spherical Surface | Infinite | — | — | — |

TABLE 4

| Surface Number | A4 | A6 | A8 | A10 | A12 | A14 | A16 |
|---|---|---|---|---|---|---|---|
| S1 | −2.8204E−02 | 1.3704E−01 | −1.2942E+00 | 5.4938E+00 | −1.3331E+01 | 1.6678E+01 | −8.4992E+00 |
| S2 | −7.2753E−02 | −2.7539E−02 | −8.4746E−01 | 2.9779E+00 | −6.1048E+00 | 6.4572E+00 | −2.7600E+00 |
| S3 | 3.9957E−02 | −2.7259E−01 | −1.1582E+00 | 5.2626E+00 | −1.2953E+01 | 1.5196E+01 | −6.6176E+00 |
| S4 | 7.3554E−02 | −1.8313E−01 | 2.6593E−01 | −4.6048E−01 | 2.3107E−01 | −8.4623E−02 | 3.0077E−02 |
| S5 | −1.2659E−01 | −5.1310E−01 | 1.4758E+00 | −1.6659E+00 | 1.0824E+00 | −7.4287E−01 | 3.0619E−01 |
| S6 | −1.0501E−01 | −7.8477E−02 | 1.1707E−01 | 6.3616E−03 | −1.3357E−01 | 1.1270E−01 | −2.7714E−02 |
| S7 | −2.2959E−02 | 2.7609E−01 | −4.9005E−01 | 4.0996E−01 | −1.6106E−01 | 2.4865E−02 | −5.1344E−04 |
| S8 | −3.0160E−01 | 4.4414E−01 | −5.3604E−01 | 4.2700E−01 | −1.6574E−01 | 2.4597E−02 | 2.8390E−05 |
| S9 | 3.6612E−02 | −9.5521E−02 | 5.8403E−02 | −4.1004E−02 | 2.4275E−02 | −8.5292E−03 | 1.1880E−03 |
| S10 | 6.5963E−02 | −9.3555E−02 | 3.2589E−02 | −1.1103E−03 | −2.7383E−03 | 8.2907E−04 | −7.7632E−05 |
| S11 | −1.3699E−01 | 3.8799E−02 | −1.4815E−02 | 7.3840E−03 | −2.0004E−03 | 2.5692E−04 | −1.2808E−05 |
| S12 | −9.7845E−02 | 4.0753E−02 | −1.4011E−02 | 3.4759E−03 | −5.8304E−04 | 5.5977E−05 | −2.2129E−06 |

In addition, f1=4.47 mm; f2=75.32 mm; f3=−14.72 mm; f4=1.56 mm; f5=−6.65 mm; f6=−2.26 mm and f=2.97 mm; HFOV=47.0°; TTL=4.37 mm; Fno=2.0.

Embodiment 3

Referring to FIG. 11 to FIG. 15, in embodiment 3, the camera lens satisfies the following conditions shown in Table 5 and Table 6:

TABLE 5

| Surface Number | Surface Type | Radius of Curvature | Thickness | Refractive index/Abbe number | Conic Coefficient |
|---|---|---|---|---|---|
| OBJ | Spherical Surface | Infinite | Infinite | — | — |
| STO | Spherical Surface | Infinite | −0.1059 | — | — |
| S1 | Aspheric Surface | 1.9384 | 0.5668 | 1.544/56.11 | −0.0931 |
| S2 | Aspheric Surface | 9.6741 | 0.3045 | — | −48.5808 |
| S3 | Aspheric Surface | −10.6421 | 0.2601 | 1.651/21.52 | −98.8459 |
| S4 | Aspheric Surface | −12.3260 | 0.0300 | — | −0.6800 |
| S5 | Aspheric Surface | 3.4990 | 0.2500 | 1.651/21.52 | −88.1053 |
| S6 | Aspheric Surface | 2.4804 | 0.1471 | — | −23.7094 |
| S7 | Aspheric Surface | −3.7643 | 0.9208 | 1.544/56.11 | −32.5927 |
| S8 | Aspheric Surface | −0.7406 | 0.0300 | — | −3.7450 |
| S9 | Aspheric Surface | 8.4546 | 0.2426 | 1.651/21.52 | −97.8643 |
| S10 | Aspheric Surface | 2.6996 | 0.2539 | — | −56.2662 |
| S11 | Aspheric Surface | 4.8787 | 0.3000 | 1.544/56.11 | 2.3780 |
| S12 | Aspheric Surface | 0.9596 | 0.6298 | — | −5.2149 |
| S13 | Spherical Surface | Infinite | 0.2100 | 1.517/64.17 | — |
| S14 | Spherical Surface | Infinite | 0.2418 | — | — |
| S15 | Spherical Surface | Infinite | — | — | — |

TABLE 6

| Surface Number | A4 | A6 | A8 | A10 | A12 | A14 | A16 |
|---|---|---|---|---|---|---|---|
| S1 | −2.6322E−02 | 9.0640E−02 | −8.8090E−01 | 3.6195E+00 | −8.6997E+00 | 1.0837E+01 | −5.5540E+00 |
| S2 | −7.3349E−02 | −9.8350E−02 | −2.8562E−01 | 9.8479E−01 | −2.1979E+00 | 2.4906E+00 | −1.1376E+00 |
| S3 | 4.1450E−02 | −3.9974E−01 | −4.9943E−01 | 3.3661E+00 | −9.4799E+00 | 1.1759E+01 | −5.2728E+00 |
| S4 | 8.2251E−02 | −2.2417E−01 | 1.5066E+00 | 4.0038E+00 | −1.3876E+00 | 1.1903E+00 | −3.3911E−01 |
| S5 | −1.4258E−01 | −3.6122E−01 | 7.0710E−01 | 3.8834E−01 | −1.7934E+00 | 1.2490E+00 | −2.3340E−01 |
| S6 | −1.0928E−01 | −4.1871E−02 | −9.8404E−03 | 2.3068E−01 | −3.2426E−01 | 1.8713E−01 | −3.8238E−02 |
| S7 | −1.5545E−02 | 2.8213E−01 | −5.9315E−01 | 6.3156E−01 | −3.6512E−01 | 1.1175E−01 | −1.4487E−02 |
| S8 | −2.7962E−01 | 3.7637E−01 | −4.2708E−01 | 3.3069E−01 | −1.2361E−01 | 1.7093E−02 | 1.5632E−04 |
| S9 | 3.8124E−02 | −9.2709E−02 | 5.8150E−02 | −3.7387E−02 | 1.9574E−02 | −6.2967E−03 | 8.2418E−04 |

TABLE 6-continued

| Surface Number | A4 | A6 | A8 | A10 | A12 | A14 | A16 |
|---|---|---|---|---|---|---|---|
| S10 | 5.9863E−02 | −8.5837E−02 | 2.9795E−02 | −1.2466E−03 | −2.2789E−03 | 6.7905E−04 | −6.1540E−05 |
| S11 | −1.3873E−01 | 3.6890E−02 | −1.2297E−02 | 6.1185E−03 | −1.6656E−03 | 2.1183E−04 | −1.0356E−05 |
| S12 | −9.7742E−02 | 4.0250E−02 | −1.3079E−02 | 3.0657E−03 | −4.9350E−04 | 4.6053E−05 | −1.7860E−06 |

In addition, f1=4.33 mm; f2=−126.42 mm; f3=−14.38 mm; f4=1.52 mm; f5=−6.15 mm; f6=−2.25 mm and f=2.97 mm; HFOV=46.8°; TTL=4.39 mm; Fno=2.0.

Embodiment 4

Referring to FIG. 16 to FIG. 20, in embodiment 4, the camera lens satisfies the following conditions shown in Table 7 and Table 8:

TABLE 7

| Surface Number | Surface Type | Radius of Curvature | Thickness | Refractive index/Abbe number | Conic Coefficient |
|---|---|---|---|---|---|
| OBJ | Spherical Surface | Infinite | Infinite | — | — |
| STO | Spherical Surface | Infinite | −0.1087 | — | — |
| S1 | Aspheric Surface | 1.8819 | 0.5728 | 1.544/56.11 | −0.2467 |
| S2 | Aspheric Surface | 10.9221 | 0.3119 | — | −9.8047 |
| S3 | Aspheric Surface | −8.0833 | 0.2437 | 1.651/21.52 | 53.0270 |
| S4 | Aspheric Surface | −5.4662 | 0.0513 | — | −9.3516 |
| S5 | Aspheric Surface | −700.6079 | 0.2869 | 1.651/21.52 | 94.4069 |
| S6 | Aspheric Surface | 4.0829 | 0.1224 | — | −13.7811 |
| S7 | Aspheric Surface | −4.2643 | 0.8492 | 1.544/56.11 | −25.3911 |
| S8 | Aspheric Surface | −0.7574 | 0.0107 | — | −3.6098 |
| S9 | Aspheric Surface | 8.7367 | 0.2829 | 1.651/21.52 | −30.1887 |
| S10 | Aspheric Surface | 3.0526 | 0.2591 | — | −52.5216 |
| S11 | Aspheric Surface | 4.8612 | 0.2966 | 1.544/56.11 | 2.3895 |
| S12 | Aspheric Surface | 0.9934 | 0.6149 | — | −5.2301 |
| S13 | Spherical Surface | Infinite | 0.2100 | 1.517/64.17 | — |
| S14 | Spherical Surface | Infinite | 0.2532 | — | — |
| S15 | Spherical Surface | Infinite | — | — | — |

TABLE 8

| Surface Number | A4 | A6 | A8 | A10 | A12 | A14 | A16 |
|---|---|---|---|---|---|---|---|
| S1 | −2.8937E−02 | 1.0247E−01 | −8.5664E−01 | 3.6016E+00 | −8.7314E+00 | 1.0800E+01 | −5.4892E+00 |
| S2 | −6.7368E−02 | −1.0160E−01 | −2.8132E−01 | 1.0032E+00 | −2.2228E+00 | 2.4825E+00 | −1.1582E+00 |
| S3 | 1.7012E−02 | −3.3121E−01 | −5.0099E−01 | 3.3484E+00 | −9.5014E+00 | 1.1753E+01 | −5.2552E+00 |
| S4 | 8.1268E−02 | −2.2826E−01 | 1.5407E−01 | 4.0877E−01 | −1.3879E+00 | 1.1895E+00 | −3.4267E−01 |
| S5 | −1.4459E−01 | −3.5603E−01 | 7.0654E−01 | 3.8557E−01 | −1.7955E+00 | 1.2486E+00 | −2.3010E−01 |
| S6 | −1.0686E−01 | −4.2444E−02 | −1.0611E−02 | 2.2975E−01 | −3.2464E−01 | 1.8695E−01 | −3.8273E−02 |
| S7 | −1.6255E−02 | 2.8222E−01 | −5.9376E−01 | 6.3035E−01 | −3.6468E−01 | 1.1201E−01 | −1.4398E−02 |
| S8 | −2.9290E−01 | 3.7913E−01 | −4.2618E−01 | 3.3094E−01 | −1.2353E−01 | 1.7202E−02 | 1.6533E−04 |
| S9 | 3.7590E−02 | −9.2300E−02 | 5.8255E−02 | −3.7365E−02 | 1.9585E−02 | −6.3009E−03 | 8.2375E−04 |
| S10 | 5.7904E−02 | −8.5891E−02 | 2.9805E−02 | −1.2410E−03 | −2.2782E−03 | 6.7929E−04 | −6.1494E−05 |
| S11 | −1.3919E−01 | 3.6872E−02 | −1.2298E−02 | 6.1186E−03 | −1.6655E−03 | 2.1185E−04 | −1.0349E−05 |
| S12 | −9.6657E−02 | 4.0263E−02 | −1.3080E−02 | 3.0654E−03 | −4.9357E−04 | 4.6039E−05 | −1.7884E−06 |

In addition, f1=4.07 mm; f2=24.81 mm; f3=−6.18 mm; f4=1.55 mm; f5=−7.29 mm; f6=−2.35 mm and f=2.92 mm; HFOV=45.5°; TTL=4.37 mm; Fno=2.0.

Embodiment 5

Referring to FIG. 21 to FIG. 25, in embodiment 5, the camera lens satisfies the following conditions shown in Table 9 and Table 10:

TABLE 9

| Surface Number | Surface Type | Radius of Curvature | Thickness | Refractive index/Abbe number | Conic Coefficient |
|---|---|---|---|---|---|
| OBJ | Spherical Surface | Infinite | Infinite | — | — |
| STO | Spherical Surface | Infinite | −0.1179 | — | — |
| S1 | Aspheric Surface | 1.9260 | 0.5588 | 1.544/56.11 | −0.1128 |
| S2 | Aspheric Surface | 9.4685 | 0.2954 | — | −61.5920 |
| S3 | Aspheric Surface | −22.5902 | 0.2619 | 1.651/21.52 | −450.2921 |
| S4 | Aspheric Surface | 864.0394 | 0.0350 | — | −1437.9429 |
| S5 | Aspheric Surface | 3.1663 | 0.2533 | 1.651/21.52 | −67.6096 |
| S6 | Aspheric Surface | 2.3759 | 0.1410 | — | −22.8505 |
| S7 | Aspheric Surface | −4.5372 | 0.9312 | 1.544/56.11 | −25.8584 |
| S8 | Aspheric Surface | −0.7572 | 0.0183 | — | −3.7395 |
| S9 | Aspheric Surface | 11.6085 | 0.2649 | 1.651/21.52 | −99.7567 |
| S10 | Aspheric Surface | 2.9409 | 0.2600 | — | −54.9354 |
| S11 | Aspheric Surface | 4.8772 | 0.3123 | 1.544/56.11 | 2.3873 |
| S12 | Aspheric Surface | 0.9889 | 0.5803 | — | −5.4299 |
| S13 | Spherical Surface | Infinite | 0.2100 | 1.517/64.17 | — |
| S14 | Spherical Surface | Infinite | 0.2595 | — | — |
| S15 | Spherical Surface | Infinite | — | — | — |

TABLE 10

| Surface Number | A4 | A6 | A8 | A10 | A12 | A14 | A16 |
|---|---|---|---|---|---|---|---|
| S1 | −2.7476E−02 | 9.4885E−02 | −8.7823E−01 | 3.6084E+00 | −8.7280E+00 | 1.0821E+01 | −5.4447E+00 |
| S2 | −7.3695E−02 | −9.2291E−02 | −2.8522E−01 | 9.8152E−01 | −2.1948E+00 | 2.4973E+00 | −1.1357E+00 |
| S3 | 4.7155E−02 | −3.9599E−01 | −4.9759E−01 | 3.3682E+00 | −9.4731E+00 | 1.1779E+01 | −5.2428E+00 |
| S4 | 7.4245E−02 | −2.2564E−01 | 1.5446E−01 | 4.0622E−01 | −1.3835E+00 | 1.1907E+00 | −3.4071E−01 |
| S5 | −1.3680E−01 | −3.5715E−01 | 7.0754E−01 | 3.8691E−01 | −1.7952E+00 | 1.2480E+00 | −2.3365E−01 |
| S6 | −1.0901E−01 | −4.2534E−01 | −1.0299E−02 | 2.3050E−01 | −3.2431E−01 | 1.8711E−01 | −3.8242E−02 |
| S7 | −1.7242E−02 | 2.8171E−01 | −5.9323E−01 | 6.3155E−01 | −3.6513E−01 | 1.1173E−01 | −1.4537E−02 |
| S8 | −2.7885E−01 | 3.7676E−01 | −4.2698E−01 | 3.3071E−01 | −1.2361E−01 | 1.7098E−02 | 1.5822E−04 |
| S9 | 3.9966E−02 | −9.2648E−02 | 5.8049E−02 | −3.7411E−02 | 1.9573E−02 | −6.2953E−03 | 8.2487E−04 |
| S10 | 5.9148E−02 | −8.5816E−02 | 2.9804E−02 | −1.2446E−02 | −2.2786E−03 | 6.7914E−04 | −6.1530E−05 |
| S11 | −1.3899E−01 | 3.6876E−02 | −1.2297E−02 | 6.1187E−03 | −1.6655E−03 | 2.1185E−04 | −1.0351E−05 |
| S12 | −9.7332E−02 | 4.0257E−02 | −1.3081E−02 | 3.0652E−03 | −4.9358E−04 | 4.6039E−05 | −1.7884E−06 |

In addition, f1=4.32 mm; f2=−33.54 mm; f3=−16.61 mm; f4=1.53 mm; f5=−6.07 mm; f6=−2.34 mm and f=2.95 mm; HFOV=45.4°; TTL=4.38 mm; Fno=2.0.

Embodiment 6

Referring to FIG. 26 to FIG. 30, in embodiment 6, the camera lens satisfies the following conditions shown in Table 11 and Table 12:

TABLE 11

| Surface Number | Surface Type | Radius of Curvature | Thickness | Refractive index/Abbe number | Conic Coefficient |
|---|---|---|---|---|---|
| OBJ | Spherical Surface | Infinite | Infinite | — | — |
| STO | Spherical Surface | Infinite | −0.1133 | — | — |
| S1 | Aspheric Surface | 1.9542 | 0.5656 | 1.544/56.11 | 0.0260 |
| S2 | Aspheric Surface | 9.3810 | 0.3289 | — | −111.5663 |
| S3 | Aspheric Surface | 520.1211 | 0.2528 | 1.651/21.52 | −1498.2188 |
| S4 | Aspheric Surface | −31.2093 | 0.0344 | — | 94.9903 |
| S5 | Aspheric Surface | 3.9123 | 0.2157 | 1.651/21.52 | −93.0366 |
| S6 | Aspheric Surface | 2.3979 | 0.1331 | — | −21.5451 |
| S7 | Aspheric Surface | −4.4045 | 0.9568 | 1.544/56.11 | −25.0819 |

TABLE 11-continued

| Surface Number | Surface Type | Radius of Curvature | Thickness | Refractive index/Abbe number | Conic Coefficient |
|---|---|---|---|---|---|
| S8 | Aspheric Surface | −0.8476 | 0.0219 | — | −3.4130 |
| S9 | Aspheric Surface | 12.2487 | 0.3448 | 1.651/21.52 | −104.4953 |
| S10 | Aspheric Surface | 4.3760 | 0.2270 | — | −42.7198 |
| S11 | Aspheric Surface | 4.7848 | 0.3335 | 1.544/56.11 | 2.4005 |
| S12 | Aspheric Surface | 0.9789 | 0.5247 | — | −5.0752 |
| S13 | Spherical Surface | Infinite | 0.2100 | 1.517/64.17 | — |
| S14 | Spherical Surface | Infinite | 0.2841 | — | — |
| S15 | Spherical Surface | Infinite | — | — | — |

TABLE 12

| Surface Number | A4 | A6 | A8 | A10 | A12 | A14 | A16 |
|---|---|---|---|---|---|---|---|
| S1 | −2.5634E−02 | 7.0272E−02 | −8.0190E−01 | 3.4799E+00 | −8.5632E+00 | 1.0549E+01 | −5.1575E+00 |
| S2 | −6.9777E−02 | −8.6072E−02 | −1.2356E−01 | 3.2087E−01 | −7.6960E−01 | 9.1288E−01 | −4.1252E−01 |
| S3 | 8.0706E−03 | −2.3417E−01 | −1.2844E+00 | 5.7001E+00 | −1.2662E+01 | 1.3423E+01 | −5.3098E+00 |
| S4 | 6.9145E−02 | 1.3469E−01 | −2.0752E+00 | 6.1709E+00 | −8.8545E+00 | 5.9708E+00 | −1.5374E+00 |
| S5 | −2.2759E−01 | 3.9869E−01 | −2.1351E+00 | 6.2442E+00 | −8.4010E+00 | 5.1084E+00 | −1.1490E+00 |
| S6 | −1.4592E−01 | 1.1777E−01 | −3.7684E−01 | 7.7489E−01 | −7.7345E−01 | 3.7360E−01 | −6.8540E−02 |
| S7 | 3.3011E−02 | 8.9256E−02 | −2.4797E−01 | 2.8322E−01 | −1.6224E−01 | 4.6600E−02 | −5.3893E−03 |
| S8 | −2.0992E−01 | 2.2616E−01 | −2.3026E−01 | 1.6459E−01 | −4.1296E−02 | −5.0904E−03 | 2.6145E−03 |
| S9 | 2.6029E−02 | −8.2204E−02 | 6.3494E−02 | −4.2531E−02 | 2.0088E−02 | −5.7931E−03 | 6.9482E−04 |
| S10 | 4.5555E−02 | −6.2901E−02 | 1.7990E−02 | 1.5524E−03 | −2.5055E−03 | 6.3142E−04 | −5.2458E−05 |
| S11 | −1.2646E−01 | 3.2363E−02 | −9.1386E−03 | 4.2601E−03 | −1.1489E−03 | 1.4442E−04 | −6.9415E−06 |
| S12 | −9.6787E−02 | 4.2383E−02 | −1.4754E−02 | 3.7370E−03 | −6.0837E−04 | 5.4886E−05 | −2.0510E−06 |

In addition, f1=4.40 mm; f2=44.86 mm; f3=−10.0 mm; f4=1.76 mm; f5=−10.56 mm; f6=−2.33 mm and f=2.97 mm; HFOV=47.0°; TTL=4.43 mm; Fno=2.0.

Embodiment 7

Referring to FIG. 31 to FIG. 35, in embodiment 7, the camera lens satisfies the following conditions shown in Table 13 and Table 14:

TABLE 13

| Surface Number | Surface Type | Radius of Curvature | Thickness | Refractive index/Abbe number | Conic Coefficient |
|---|---|---|---|---|---|
| OBJ | Spherical Surface | Infinite | Infinite | — | — |
| STO | Spherical Surface | Infinite | −0.1300 | — | — |
| S1 | Aspheric Surface | 1.9380 | 0.5683 | 1.544/56.11 | 0.0188 |
| S2 | Aspheric Surface | 8.9851 | 0.3333 | — | −83.3285 |
| S3 | Aspheric Surface | 77.1942 | 0.2450 | 1.651/21.52 | −1384.6512 |
| S4 | Aspheric Surface | 708.6583 | 0.0396 | — | −1499.8302 |
| S5 | Aspheric Surface | 3.7153 | 0.2165 | 1.651/21.52 | −80.1175 |
| S6 | Aspheric Surface | 2.3942 | 0.1348 | — | −21.6287 |
| S7 | Aspheric Surface | −4.6801 | 0.9538 | 1.544/56.11 | −26.9645 |
| S8 | Aspheric Surface | −0.8580 | 0.0266 | — | −3.4476 |
| S9 | Aspheric Surface | 13.7513 | 0.3449 | 1.651/21.52 | −156.4209 |
| S10 | Aspheric Surface | 5.1735 | 0.2119 | — | −47.0702 |
| S11 | Aspheric Surface | 4.7867 | 0.3368 | 1.544/56.11 | 2.4058 |
| S12 | Aspheric Surface | 0.9631 | 0.5000 | — | −4.9943 |
| S13 | Spherical Surface | Infinite | 0.2100 | 1.517/64.17 | — |
| S14 | Spherical Surface | Infinite | 0.3158 | — | — |
| S15 | Spherical Surface | Infinite | — | — | — |

TABLE 14

| Surface Number | A4 | A6 | A8 | A10 | A12 | A14 | A16 |
|---|---|---|---|---|---|---|---|
| S1 | −2.2959E−02 | 7.0436E−02 | −8.0821E−01 | 3.4783E+00 | −8.5391E+00 | 1.0581E+01 | −5.2153E+00 |
| S2 | −6.7575E−02 | −8.6602E−02 | −1.2165E−01 | 3.2427E−01 | −7.6887E−01 | 9.1248E−01 | −4.1024E−01 |
| S3 | 9.9674E−03 | −2.3507E−01 | −1.2911E+00 | 5.6932E+00 | −1.2659E+01 | 1.3426E+01 | −5.2997E+00 |
| S4 | 6.4966E−02 | 1.3113E−01 | −2.0783E+00 | 6.1682E+00 | −8.8561E+00 | 5.9699E+00 | −1.5377E+00 |
| S5 | −2.2686E−01 | 3.9901E−01 | −2.1355E+00 | 6.2424E+00 | −8.4030E+00 | 5.1057E+00 | −1.1503E+00 |
| S6 | −1.4501E−01 | 1.1845E−01 | −3.7644E−01 | 7.7508E−01 | −7.7339E−01 | 3.7355E−01 | −6.8724E−02 |

TABLE 14-continued

| Surface Number | A4 | A6 | A8 | A10 | A12 | A14 | A16 |
|---|---|---|---|---|---|---|---|
| S7 | 3.3739E−02 | 8.9462E−02 | −2.4786E−01 | 2.8310E−01 | −1.6223E−01 | 4.6635E−02 | −5.3417E−03 |
| S8 | −2.1125E−01 | 2.2607E−01 | −2.3014E−01 | 1.6466E−01 | −4.1255E−02 | −5.0768E−03 | 2.6297E−03 |
| S9 | 2.5821E−02 | −8.2189E−02 | 6.3678E−02 | −4.2493E−02 | 2.0093E−02 | −5.7880E−03 | 6.9583E−04 |
| S10 | 4.4877E−02 | −6.2966E−02 | 1.7982E−02 | 1.5502E−03 | −2.5062E−03 | 6.3127E−04 | −5.2481E−05 |
| S11 | −1.2655E−01 | 3.2346E−02 | −9.1404E−03 | 4.2602E−03 | −1.1489E−03 | 1.4442E−04 | −6.9403E−06 |
| S12 | −9.6849E−02 | 4.2382E−02 | −1.4754E−02 | 3.7370E−03 | −6.0837E−04 | 5.4887E−05 | −2.0500E−06 |

In addition, f1=4.40 mm; f2=131.96 mm; f3=−10.97 mm; f4=1.77 mm; f5=−12.84 mm; f6=−2.28 mm and f=2.97 mm; HFOV=47.0°; TTL=4.44 mm; Fno=2.0.

Embodiment 8

Referring to FIG. 36 to FIG. 40, in embodiment 8, the camera lens satisfies the following conditions shown in Table 15 and Table 16:

TABLE 15

| Surface Number | Surface Type | Radius of Curvature | Thickness | Refractive index/Abbe number | Conic Coefficient |
|---|---|---|---|---|---|
| OBJ | Spherical Surface | Infinite | Infinite | — | — |
| STO | Spherical Surface | Infinite | −0.0980 | — | — |
| S1 | Aspheric Surface | 2.1642 | 0.5823 | 1.544/56.11 | −0.4085 |
| S2 | Aspheric Surface | −672.9919 | 0.2746 | — | 94.9616 |
| S3 | Aspheric Surface | −4.4129 | 0.2056 | 1.651/21.52 | −11.2869 |
| S4 | Aspheric Surface | −4.9613 | 0.0235 | — | −23.6475 |
| S5 | Aspheric Surface | 4.1275 | 0.2430 | 1.651/21.52 | −129.2766 |
| S6 | Aspheric Surface | 2.6380 | 0.1341 | — | −26.8760 |
| S7 | Aspheric Surface | −3.3717 | 0.9377 | 1.544/56.11 | −28.1483 |
| S8 | Aspheric Surface | −0.7448 | 0.0214 | — | −3.7604 |
| S9 | Aspheric Surface | 10.0381 | 0.2817 | 1.544/56.11 | −42.6926 |
| S10 | Aspheric Surface | 2.8540 | 0.2412 | — | −59.3769 |
| S11 | Aspheric Surface | 4.7586 | 0.3112 | 1.544/56.11 | 2.3162 |
| S12 | Aspheric Surface | 0.9953 | 0.5584 | — | −5.3532 |
| S13 | Spherical Surface | Infinite | 0.2100 | 1.517/64.17 | — |
| S14 | Spherical Surface | Infinite | 0.3797 | — | — |
| S15 | Spherical Surface | Infinite | — | — | — |

TABLE 16

| Surface Number | A4 | A6 | A8 | A10 | A12 | A14 | A16 |
|---|---|---|---|---|---|---|---|
| S1 | −3.4488E−02 | 1.3969E−01 | −1.2762E+00 | 5.4801E+00 | −1.3441E+01 | 1.6511E+01 | −8.1106E+00 |
| S2 | −9.9603E−02 | −3.8072E−02 | −8.0004E−01 | 2.9856E+00 | −6.1756E+00 | 6.3809E+00 | −2.6127E+00 |
| S3 | 2.9175E−02 | −2.7962E−01 | −1.1400E+00 | 5.2941E+00 | −1.2953E+01 | 1.5152E+01 | −6.6439E+00 |
| S4 | 8.3103E−02 | −1.8120E−01 | 2.6002E−01 | −4.6791E−01 | 2.2841E−01 | −8.4722E−02 | 2.5719E−02 |
| S5 | −1.2746E−01 | −5.1432E−01 | 1.4758E+00 | −1.6645E+00 | 1.0824E+00 | −7.4498E−01 | 3.0429E−01 |
| S6 | −1.0780E−01 | −7.8665E−02 | 1.1781E−01 | 6.5033E−03 | −1.3374E−01 | 1.1153E−01 | −2.8814E−02 |
| S7 | −2.3688E−02 | 2.7638E−01 | −4.8958E−01 | 4.1010E−01 | −1.6119E−01 | 2.4626E−02 | −4.2049E−04 |
| S8 | −3.0461E−01 | 4.4338E−01 | −5.3618E−01 | 4.2713E−01 | −1.6547E−01 | 2.4867E−02 | 1.9924E−04 |
| S9 | 4.0951E−02 | −9.6896E−02 | 5.8508E−02 | −4.0890E−02 | 2.4280E−02 | −8.5442E−03 | 1.1730E−03 |
| S10 | 6.6097E−02 | −9.3447E−02 | 3.2606E−02 | −1.1068E−03 | −2.7372E−03 | 8.2937E−04 | −7.7545E−05 |
| S11 | −1.3660E−01 | 3.8818E−02 | −1.4813E−02 | 7.3840E−03 | −2.0003E−03 | 2.5694E−04 | −1.2817E−05 |
| S12 | −9.4694E−02 | 4.0884E−02 | −1.4013E−02 | 3.4741E−03 | −5.8339E−04 | 5.5917E−05 | −2.2229E−06 |

In addition, f1=3.95 mm; f2=−71.45 mm; f3=−11.91 mm; f4=1.55 m; f5=−6.17 mm; f6=−2.37 mm and f=2.95 mm; HFOV=47.0°; TTL=4.40 mm; Fno=2.0.

Embodiment 9

Referring to FIG. 41 to FIG. 45, in embodiment 9, the camera lens satisfies the following conditions shown in Table 17 and Table 18:

TABLE 17

| Surface Number | Surface Type | Radius of Curvature | Thickness | Refractive index/Abbe number | Conic Coefficient |
|---|---|---|---|---|---|
| OBJ | Spherical Surface | Infinite | Infinite | — | — |
| STO | Spherical Surface | Infinite | −0.1308 | — | — |
| S1 | Aspheric Surface | 1.8817 | 0.6777 | 1.544/56.11 | −0.0807 |
| S2 | Aspheric Surface | 8.9291 | 0.2580 | — | −258.2261 |
| S3 | Aspheric Surface | −16.8048 | 0.1904 | 1.651/21.52 | 62.1433 |
| S4 | Aspheric Surface | −12.8028 | 0.0419 | — | 29.1790 |
| S5 | Aspheric Surface | 3.5894 | 0.2379 | 1.651/21.52 | −128.6573 |
| S6 | Aspheric Surface | 2.2963 | 0.1214 | — | −27.3684 |
| S7 | Aspheric Surface | −6.9452 | 0.9414 | 1.544/56.11 | −40.1878 |
| S8 | Aspheric Surface | −0.8468 | 0.0300 | — | −4.1522 |
| S9 | Aspheric Surface | −23.5723 | 0.3079 | 1.544/56.11 | −1445.6162 |
| S10 | Aspheric Surface | 4.8137 | 0.4349 | — | −147.4755 |
| S11 | Aspheric Surface | −712.3813 | 0.2977 | 1.544/56.11 | −1499.7312 |
| S12 | Aspheric Surface | 1.2337 | 0.3444 | — | −6.3904 |
| S13 | Spherical Surface | Infinite | 0.2100 | 1.517/64.17 | — |
| S14 | Spherical Surface | Infinite | 0.2343 | — | — |
| S15 | Spherical Surface | Infinite | — | — | — |

TABLE 18

| Surface Number | A4 | A6 | A8 | A10 | A12 | A14 | A16 |
|---|---|---|---|---|---|---|---|
| S1 | −2.7843E−02 | 1.4704E−01 | −1.2732E+00 | 5.4923E+00 | −1.3379E+01 | 1.6661E+01 | −8.3311E+00 |
| S2 | −6.8097E−02 | −1.4357E−02 | −8.6537E−01 | 2.9697E+00 | −6.0976E+00 | 6.4809E+00 | −2.6979E+00 |
| S3 | 3.4042E−02 | −2.8135E−01 | −1.1560E+00 | 5.2445E+00 | −1.2953E+01 | 1.5241E+01 | −6.5106E+00 |
| S4 | 7.4665E−02 | −1.7744E−01 | 2.7825E−01 | −4.4471E−01 | 2.3538E−01 | −8.8518E−02 | 2.2909E−02 |
| S5 | −1.1944E−01 | −4.9561E−01 | 1.4854E+00 | −1.6662E+00 | 1.0761E+00 | −7.4953E−01 | 2.9992E−01 |
| S6 | −9.0186E−02 | −7.9120E−02 | 1.1418E−01 | 3.9775E−03 | −1.3387E−01 | 1.1327E−01 | −2.6468E−02 |
| S7 | −2.2900E−02 | 2.7756E−01 | −4.8951E−01 | 4.0908E−01 | −1.6194E−01 | 2.4562E−02 | −2.3209E−04 |
| S8 | −3.0070E−01 | 4.4353E−01 | −5.3770E−01 | 4.2619E−01 | −1.6605E−01 | 2.4518E−02 | −5.4881E−06 |
| S9 | 5.6280E−02 | −1.1614E−01 | 6.1777E−02 | −4.0033E−02 | 2.4251E−02 | −8.6448E−03 | 1.1090E−03 |
| S10 | 5.3574E−02 | −9.3949E−02 | 3.2585E−02 | −1.0938E−02 | −2.7309E−03 | 8.3185E−04 | −7.6703E−05 |
| S11 | −1.3242E−01 | 3.9372E−02 | −1.4733E−02 | 7.3925E−03 | −1.9996E−03 | 2.5695E−04 | −1.2806E−05 |
| S12 | −9.5064E−02 | 4.1869E−02 | −1.4017E−02 | 3.4662E−03 | −5.8480E−04 | 5.5720E−05 | −2.2440E−06 |

In addition, f1=4.22 mm; f2=80.39 mm; f3=−10.47 mm; f4=1.68 mm; f5=−6.06 mm; f6=−2.26 mm and f=2.97 mm; HFOV=45.4°; TTL=4.33 mm; Fno=2.0.

Embodiment 10

Referring to FIG. 46 to FIG. 50, in embodiment 10, the camera lens satisfies the following conditions shown in Table 19 and Table 20:

TABLE 19

| Surface Number | Surface Type | Radius of Curvature | Thickness | Refractive index/Abbe number | Conic Coefficient |
|---|---|---|---|---|---|
| OBJ | Spherical Surface | Infinite | 无穷 | — | — |
| STO | Spherical Surface | Infinite | −0.0906 | — | — |
| S1 | Aspheric Surface | 2.0039 | 0.5567 | 1.544/56.11 | −0.0277 |
| S2 | Aspheric Surface | 9.9944 | 0.3243 | — | −54.1780 |
| S3 | Aspheric Surface | −18.8267 | 0.2300 | 1.651/21.52 | 0.5575 |
| S4 | Aspheric Surface | −34.3722 | 0.0333 | — | −0.1054 |
| S5 | Aspheric Surface | 3.5758 | 0.2300 | 1.651/21.52 | −82.8612 |
| S6 | Aspheric Surface | 2.7721 | 0.1395 | — | −24.1068 |
| S7 | Aspheric Surface | −3.7793 | 0.9715 | 1.544/56.11 | −32.0987 |

TABLE 19-continued

| Surface Number | Surface Type | Radius of Curvature | Thickness | Refractive index/Abbe number | Conic Coefficient |
|---|---|---|---|---|---|
| S8 | Aspheric Surface | −0.7351 | 0.0300 | — | −3.6951 |
| S9 | Aspheric Surface | Infinite | 0.3313 | 1.651/21.52 | −90.1512 |
| S10 | Aspheric Surface | 2.7770 | 0.2431 | — | −63.7914 |
| S11 | Aspheric Surface | 3.4171 | 0.3000 | 1.544/56.11 | 0.9085 |
| S12 | Aspheric Surface | 0.9830 | 0.6692 | — | −4.5921 |
| S13 | Spherical Surface | Infinite | 0.1100 | 1.517/64.17 | — |
| S14 | Spherical Surface | Infinite | 0.2812 | — | — |
| S15 | Spherical Surface | Infinite | — | — | — |

TABLE 20

| Surface Number | A4 | A6 | A8 | A10 | A12 | A14 | A16 |
|---|---|---|---|---|---|---|---|
| S1 | −2.7900E−02 | 1.0144E−01 | −8.7882E−01 | 3.3270E+00 | −7.3738E+00 | 8.5276E+00 | −4.0790E+00 |
| S2 | −6.3543E−02 | −1.4983E−01 | 2.0104E−01 | −6.8632E−01 | 1.0935E+00 | −9.4601E−01 | 3.2786E−01 |
| S3 | 6.0515E−03 | −1.6061E−01 | −1.2839E+00 | 4.5528E+00 | −9.3361E+00 | 9.7598E+00 | −4.0020E+00 |
| S4 | 3.0151E−02 | 7.9459E−02 | −7.1979E−01 | 1.3758E+00 | −1.5597E+00 | 8.0949E−01 | −1.5759E−01 |
| S5 | −1.4632E−01 | −1.1956E−01 | 1.8678E−01 | 4.5318E−01 | −1.0184E+00 | 5.1882E−01 | −3.7689E−02 |
| S6 | −1.3218E−01 | 8.4359E−02 | −2.4450E−01 | 4.7078E−01 | −4.8211E−01 | 2.5341E−01 | −5.1338E−02 |
| S7 | −4.2538E−02 | 3.8004E−01 | −6.8466E−01 | 6.5515E−01 | −3.5292E−01 | 1.0175E−01 | −1.2187E−02 |
| S8 | −2.1810E−01 | 2.4639E−01 | −2.1124E−01 | 8.5179E−02 | 4.0507E−02 | −4.2607E−02 | 9.2765E−03 |
| S9 | 1.2828E−01 | −2.0840E−01 | 1.7400E−01 | −1.3384E−01 | 7.4679E−02 | −2.4995E−02 | 3.4791E−03 |
| S10 | 9.5255E−02 | −1.3477E−01 | 5.9465E−02 | −1.0576E−02 | −1.4224E−03 | 8.5020E−04 | −9.0362E−05 |
| S11 | −1.5315E−01 | −3.1573E−02 | 5.3257E−02 | −1.9074E−02 | 3.1522E−03 | −2.4301E−04 | 6.4034E−06 |
| S12 | −1.2764E−01 | 4.5884E−02 | −8.9886E−03 | 7.9496E−04 | 3.5360E−05 | −1.5143E−05 | 9.9309E−07 |

In addition, f1=4.48; f2=−63.63 mm; f3=−21.14 mm; f4=1.50 mm; f5=−4.22 mm; f6=−2.64 mm and f=3.01 mm; HFOV=44.9°; TTL=4.45 mm; Fno=2.0.

In embodiments 1-10, each conditional expression satisfies conditions shown in the following table.

| | Embodiment | | | | | | | | | |
|---|---|---|---|---|---|---|---|---|---|---|
| Formula | 1 | 2 | 3 | 4 | 5 | 6 | 7 | 8 | 9 | 10 |
| f/f6 | −1.34 | −1.32 | −1.32 | −1.24 | −1.26 | −1.27 | −1.30 | −1.24 | −1.32 | −1.14 |
| f/f4 | 1.68 | 1.91 | 1.94 | 1.88 | 1.92 | 1.69 | 1.68 | 1.89 | 1.77 | 2.01 |
| T23/T12 | 0.09 | 0.10 | 0.10 | 0.16 | 0.12 | 0.10 | 0.12 | 0.09 | 0.16 | 0.10 |
| f/f1 | 0.69 | 0.67 | 0.69 | 0.72 | 0.68 | 0.67 | 0.68 | 0.75 | 0.70 | 0.67 |
| f1/f4 | 2.45 | 2.87 | 2.84 | 2.62 | 2.82 | 2.51 | 2.49 | 2.54 | 2.52 | 2.98 |
| f/f56 | −1.55 | −1.85 | −1.89 | −1.71 | −1.84 | −1.60 | −1.57 | −1.81 | −1.95 | −2.00 |
| Yc32/Yc41 | 0.74 | 0.70 | 0.72 | 0.66 | 0.71 | 0.72 | 0.75 | 0.68 | 0.83 | 0.78 |
| ImgH/f | 1.04 | 1.04 | 1.03 | 1.00 | 1.00 | 1.04 | 1.04 | 1.05 | 0.99 | 0.97 |

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance. Thus, the feature defined with "first" and "second" may comprise one or more this feature. In the description of the present disclosure, the term "a plurality of" means two or more than two, unless specified otherwise.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A camera lens, in sequence from an object side to an image side, comprising:
   a first lens having a positive refractive power, wherein an object-side surface of the first lens is a convex surface;
   a second lens having a refractive power;
   a third lens having a negative refractive power, wherein an image-side surface of the third lens is concave at a portion near an axis and has at least one point of inflection;
   a fourth lens having a positive refractive power, wherein an object-side surface of the fourth lens is concave at a portion near the axis and has at least one point of inflection, and an image-side surface of the fourth lens is a convex surface;

a fifth lens having a negative refractive power, wherein an image-side surface of the fifth lens is concave at a portion near the axis and free of any inflection point at each side of the axis, and at least one of an object-side surface and the image-side surface has at least one point of inflection;

a sixth lens having a negative refractive power, wherein an image-side surface of the sixth lens is concave at a portion near the axis;

wherein, the camera lens satisfies the following relations:

$f/f6 < -1.0$;

$f/f4 > 1.5$;

$0.5 < f/f1 < 1.0$; and $2.0 < f1/f4 < 4.0$, and wherein, f denotes an effective focal length of the camera lens, f1 denotes an effective focal length of the first lens, f4 denotes an effective focal length of the fourth lens, and f6 denotes an effective focal length of the sixth lens.

2. The camera lens according to claim 1, wherein the camera lens satisfies the following relation:

$T23/T12 < 0.5$;

wherein, T12 denotes a distance between the first lens and the second lens along the axis, and T23 denotes a distance between the second lens and the third lens along the axis.

3. The camera lens according to claim 2, wherein an object-side surface of the sixth lens is convex at a portion near the axis, and at least one of the object-side surface and the image-side surface of the sixth lens has at least one point of inflection.

4. The camera lens according to claim 3, wherein an image-side surface of the first lens is a concave surface, and an object-side surface of the third lens is convex at a portion near the axis.

5. The camera lens according to claim 1, wherein the camera lens satisfies the following relation:

$f/f56 < -1.3$;

wherein, f56 denotes a combined focal length of the fifth lens and the sixth lens.

6. The camera lens according to claim 5, wherein an object-side surface of the sixth lens is convex at a portion near the axis, and at least one of the object-side surface and the image-side surface of the sixth lens has at least one point of inflection.

7. The camera lens according to claim 6, wherein an image-side surface of the first lens is a concave surface, and an object-side surface of the third lens is convex at a portion near the axis.

8. The camera lens according to claim 1, wherein the camera lens satisfies the following relation:

$0.6 \leq Yc32/Yc41 \leq 0.85$;

wherein, Yc32 denotes a vertical distance between the point of inflection on the image-side surface of the third lens and an optical axis, Yc41 denotes a vertical distance between the point of inflection on the object-side surface of the fourth lens and the optical axis.

9. The camera lens according to claim 8, wherein an object-side surface of the sixth lens is convex at a portion near the axis, and at least one of the object-side surface and the image-side surface of the sixth lens has at least one point of inflection.

10. The camera lens according to claim 9, wherein an image-side surface of the first lens is a concave surface, and an object-side surface of the third lens is convex at a portion near the axis.

11. The camera lens according to claim 1, wherein an object-side surface of the sixth lens is convex at a portion near the axis, and at least one of the object-side surface and the image-side surface of the sixth lens has at least one point of inflection.

12. The camera lens according to claim 11, wherein an image-side surface of the first lens is a concave surface, and an object-side surface of the third lens is convex at a portion near the axis.

13. A camera lens, in sequence from an object side to an image side, comprising:

a first lens having a positive refractive power, wherein an object-side surface of the first lens is a convex surface;

a second lens having a refractive power;

a third lens having a negative refractive power, wherein an image-side surface of the third lens is concave at a portion near an axis and has at least one point of inflection;

a fourth lens having a positive refractive power, wherein an object-side surface of the fourth lens is concave at a portion near the axis and has at least one point of inflection, and an image-side surface of the fourth lens is a convex surface;

a fifth lens having a negative refractive power, wherein an image-side surface of the fifth lens is concave at a portion near the axis and free of any inflection point at each side of the axis, and at least one of an object-side surface and the image-side surface has at least one point of inflection;

a sixth lens having a negative refractive power, wherein an image-side surface of the sixth lens is concave at a portion near the axis;

wherein, the camera lens satisfies the following relations:

$f/f6 < -1.0$; and $f/f4 > 1.5$; and $ImgH/f \geq 0.9$;

and wherein, f denotes an effective focal length of the camera lens, f4 denotes an effective focal length of the fourth lens, f6 denotes an effective focal length of the sixth lens, and ImgH denotes a half of a diagonal line of an effective pixel area on an imaging plane.

14. The camera lens according to claim 13, wherein an object-side surface of the sixth lens is convex at a portion near the axis, and at least one of the object-side surface and the image-side surface of the sixth lens has at least one point of inflection.

15. The camera lens according to claim 14, wherein an image-side surface of the first lens is a concave surface, and an object-side surface of the third lens is convex at a portion near the axis.

* * * * *